United States Patent Office 3,583,997
Patented June 8, 1971

3,583,997
BENZOTHIOPYRANO[2,3-c]PYRIDINES
Anton Ebnother, Arlesheim, and Jean-Michel Bastian, Birsfelden, Switzerland, assignors to Sandoz Ltd., also known as Sandoz AG, Basel, Switzerland
No Drawing. Filed Nov. 21, 1968, Ser. No. 777,910
Claims priority, application Switzerland, Dec. 1, 1967, 16,917/67; Mar. 25, 1968, 4,391/68; Aug. 22, 1968, 12,600/68; Oct. 17, 1968, 15,498/68
Int. Cl. C07d 39/00
U.S. Cl. 260—293.4
55 Claims

ABSTRACT OF THE DISCLOSURE

The present invention provides benzothiopyrano[2,3-c] pyridine derivatives of formula:

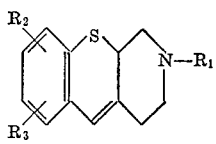

in which $R_1$ is hydrogen, lower alkyl, alkenyl or alkinyl, cycloalkyl, cycloalkenyl, cycloalkyl(lower)alkyl or cycloalkenyl(lower)alkyl, in which the cycloalkyl radical contains 3 to 6 and the cycloalkenyl radical 4 to 6 ring members, and $R_2$ and $R_3$ are hydrogen or halogen, or hydroxy, lower alkyl or alkoxy, and their acid addition salts.

The compounds of the invention exhibit analgesic and antiphlogistic properties, central depressing and stimulating effects, blood-pressure lowering effects and amine-reinforcing or inhibiting properties, and anorectic properties.

IMPROVEMENTS IN OR RELATING TO ORGANIC COMPOUNDS

The present invention relates to new 1,3,4,10a-tetrahydro-2H-[1]benzothiopyrano[2,3-c]pyridines.

The invention provides compounds of general Formula I,

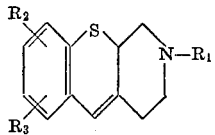

in which
$R_1$ signifies a hydrogen atom, a lower alkyl, alkenyl or alkinyl radical, a cycloalkyl, cycloalkenyl, cycloalkyl (lower)alkyl or cycloalkenyl(lower)alkyl radical, in which the cycloalkyl radical contains 3 to 6 and the cycloalkenyl radical 4 to 6 ring members, and
$R_2$ and $R_3$ signify a hydrogen or halogen atom, or a hydroxy, a lower alkyl or alkoxy radical.

According to the invention, the compounds of Formula I may be obtained by a process characterized by
(1) Splitting off water from a hydroxy compound of general Formula II,

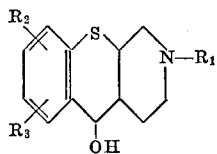

in which $R_1$, $R_2$ and $R_3$ have the above significance, or (2) Producing a compound of general Formula Ia,

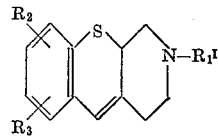

in which
$R_1^I$ signifies a lower alkyl, alkenyl or alkinyl radical, a cycloalkyl, cycloalkenyl, cycloalkyl(lower)alkyl or cycloalkenyl(lower)alkyl radical, in which the cycloalkyl radical contains 3 to 6 and the cycloalkenyl radical 4 to 6 ring members, and
$R_2$ and $R_3$ have the above significance, by reacting a compound of general Formula Ib,

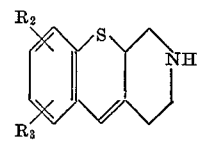

in which $R_2$ and $R_3$ have the above significance,
with a compound of general Formula III,

    III in which
$R_1^I$ has the above significance, and
X signifies the acid radical of a reactive ester, in the presence of a basic condensation agent and in a solvent which is inert under the reaction conditions, and optionally converting any lower alkoxy radicals which may be present in the product into hydroxy radicals.

Process (1) may, for example, be effected by treating a hydroxy compound of general Formula II—as free base or in the form of an acid addition salt, e.g. as hydrochloride—with a water-removing agent for about ½ to 24 hours at a temperature from room temperature to the boiling temperature of the reaction mixture.

Strong acids are preferably used for the removal of water. Examples of suitable acids are mineral acids (e.g. in aqueous or alcoholic solution) such as hydrochloric acid (e.g. as 2 N hydrochloric acid, as a mixture of concentrated hydrochloric acid and water at a ratio 3:1 or 2:1, or as a mixture of concentrated hydrochloric acid and glacial acetic acid), hydrobromic acid, hydriodic acid, sulphuric acid, phosphoric acid, or strong organic acids, e.g. organic sulphonic acids such as methanesulphonic acid, benzenesulphonic acid and particularly naphthalene-1,5-disulphonic acid.

Acid chlorides of strong acids, such as thionyl chloride or methanesulphonic acid chloride, or acid anhydrides such as acetic acid anhydride or benzoic acid anhydride, may also be used as water-removing agents.

The water-removing agents as well as the conditions for splitting off water are, of course, selected in such a manner that no substitution occurs in the 2H-[1]benzothiopyrano-[2,3-c]pyridine skeleton. Thus, for example, the acid chlorides or acid anhydrides are not used for splitting off water from compounds of general Formula II, which are unsubstituted at the nitrogen atom, because of the risk of an N-acylation.

In process (2) the basic condensation agent may, for example, be an alkali metal carbonate such as potassium carbonate or sodium carbonate, or a tertiary organic base such as triethylamine, and the solvent which is inert under the reaction conditions may, for example, be ethanol, chloroform, xylene or dimethyl formamide. The reaction is suitably carried out for about 15 to 25 hours, preferably at the boiling temperature of the solution.

Suitable compounds of Formula III are for example those in which X signifies a chlorine, bromine or iodine atom, or a methane-, benzene- or p-toluene-sulphonic acid radical.

Compounds of general Formula I, which contain one or two lower alkoxy radicals as substituents, may be converted into the corresponding hydroxy compounds in manner known per se. This may, for example, be effected by treating the alkoxy compounds with boron tribromide in a solvent which is inert under the reaction conditions, such as, for example, methylene chloride, at a low temperature, and subsequently subjecting the resulting orthoboric acid esters to hydrolysis. Other reagents, with which any lower alkoxy radicals present may be converted into hydroxy radicals, are, for example boron trichloride, hydrogen iodide or pyridinium chloride. On effecting the splitting off of water in accordance with process (1) under certain conditions (e.g. using hydrogen iodide) a conversion of lower alkoxy into hydroxy radicals may simultaneously occur.

The resulting compounds of Formula I may be recovered and purified by conventional techniques.

In process (1) the compounds of Formula I are obtained in the form of acid addition salts. The free bases may be obtained therefrom in conventional manner. Similarly, the free base forms of the compounds of Formula I obtained in process (2) may, if desired, be converted into the acid addition salt forms by salification in conventional manner.

It will be appreciated that the compounds of Formula I possess an asymmetric carbon atom. The present invention includes both the racemic forms and optical isomers. Analogously, the invention includes the use of both racemic and optically active starting materials of Formula II and Ib in the processes.

If desired, where racemic compounds of general Formula I are obtained, they may be separated in manner known per se into the optical antipodes. This separation may, for example, be effected with optically active acids such as, for example, dibenzoyl-D-tartaric acid, dibenzoyl-L-tartaric acid, di-p-tolyl-D-tartaric acid, di-p-tolyl-L-tartaric acid, D-malic acid, L-malic acid, D-mandelic acid, L-mandelic acid, and separation of the resulting diastereoisomeric salts, e.g. by fractional crystallization and liberation of the bases, e.g. with alkali metal hydroxides.

The compounds of Formula I are useful because they possess pharmacological activity in animals while their toxicity is low. In particular, they are useful as analgesics as indicated for example by the "hot plate test" in mice, the "monkey tail test" in rhesus monkeys and by an inhibition of the phenylbenzoquinone syndrome in mice. For this use the dose to be administered will naturally vary depending on the compound employed. However, in general satisfactory results are obtained when administered at a daily dosage of from 0.7 to 100 mg./kg. of animal body weight, preferably given in 2 to 3 doses, or in retard form. The total daily dose for larger mammals is in the order of 50 to 300 mg. and may be administered for example orally 2 to 3 times daily in divided doses of about 17 to 150 mg.

The compounds of Formula I are also useful as antiphlogistic agents as indicated by an inhibition of the traumatic or carrogeen edema in rats. For this use, the suitable dosages are the same as those outlined above for the analgesic use.

The compounds of Formula I are furthermore useful as anoretic agents as indicated by the test method of Randall et al. [Journal of Pharmacology and Experimental Therapy, 129 (1960), 163], in rats. For this use, the dose to be administered will naturally vary depending on the compound employed. However, in general satisfactory results are obtained when administered at a daily dosage of .3 to 20 mg./kg. of animal body weight. The total daily dose for larger mammals is in the order of 20 to 150 mg. and may be administered for example orally 2 to 3 times daily in individed dosages of about 7 to 50 mg.

The compounds of Formula I furthermore exhibit central depressing and also stimulating effects so that they are indicated for use in the treatment of neurotic or psychotic disorders. They also exhibit blood-pressure lowering and amine-reinforcing or inhibiting properties and are therefore indicated for use as antihypertensives or as β-sympathicomimetics. They are also indicated for use in tuning up in cases of fatigue or old age brain damage.

The compounds of Formula I may be used as pharmaceuticals on their own or in the form of appropriate medicinal preparations, e.g. tablets, dragées, injectable solutions, suppositories, etc., for enteral or parenteral administration. Aside from the usual inorganic or organic, pharmacologically inert adjuvants, such as lactose, starch, talcum, stearic acid, water, alcohols, glycerin, natural or hardened oils and waxes, etc., these preparations may also contain suitable preserving, stabilizing or wetting agents, solubilizers, sweetening or colouring substances, flavourings, etc. The compounds of Formula I may be used in the form of their physiologically acceptable acid addition salts which have the same order of activity as the free bases.

The compounds of general Formula II and their preparation are also included in the present invention. They may be obtained by (a) Reducing a ketone of general Formula IVa,

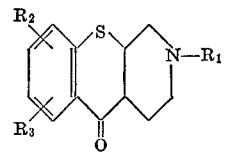

IVa in which $R_1$, $R_2$ and $R_3$ have the above significance, with sodium borohydride, potassium borohydride or lithium borohydride in a solvent which is inert under the reaction conditions, to give a compound of general Formula II, or (b) Converting a ketone of general Formula IVa by catalytic hydrogenation or reduction with lithium aluminium hydride or diborane in a solvent which is inert under the reaction conditions, into a compound of general Formula IIa,

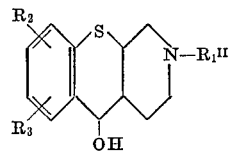

IIa in which $R_1^{II}$ signifies a hydrogen atom, or a lower alkyl radical, a cycloalkyl or cycloalkyl(lower)alkyl radical, in which the cycloalkyl radical contains 3 to 6 ring members, and $R_2$ and $R_3$ have the above significance, or (c) Reacting a compound of general Formula IIb,

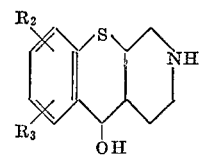

IIb in which $R_2$ and $R_3$ have the above significance, with a compound of general Formula III, in the presence of a basic condensation agent and in a solvent which is inert under the reaction conditions, to give a compound of general Formula IIc,

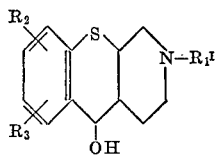

IIc in which $R_1^I$, $R_2$ and $R_3$ have the above significance, or (d) Reducing a compound of general Formula VI,

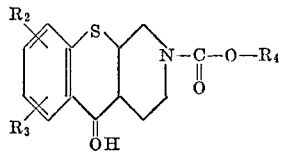

VI in which $R_2$ and $R_3$ have the above significance, and
$R_4$ signifies a lower alkyl radical, or a compound of general Formula VII,

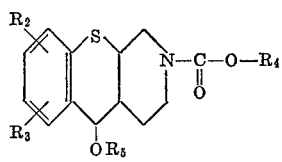

VII in which $R_2$, $R_3$ and $R_4$ have the above significance, and
$R_5$ signifies a hydrogen atom, or the radical —CO—OR$_4$, in which $R_4$ has the above significance such that both symbols $R_4$ in the compounds of general Formula VII have the same significance, with lithium aluminium hydride or diborane in a solvent which is inert under the reaction conditions, to give a compound of general Formula IId,

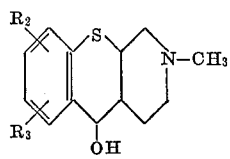

IId in which $R_2$ and $R_3$ have the above significance, or (e) Reducing a compound of general Formula VIII,

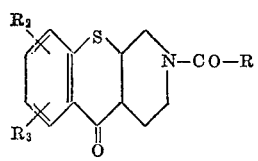

VIII in which $R_2$ and $R_3$ have the above significance, and
$R_6$ signifies a hydrogen atom, or a lower alkyl, alkenyl or alkinyl radical, a cycloalkyl, cycloalkenyl, cycloalkyl lower)alkyl or cycloalkenyl(lower)alkyl radical, in which the cycloalkyl radical contains 3 to 6 and the cycloalkenyl radical 4 to 6 ring members, or a compound of general Formula IX,

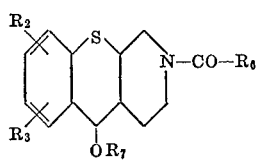

IX in which $R_2$, $R_3$ and $R_6$ have the above significance, and
$R_7$ signifies a hydrogen atom, or the radical —CO—R$_6$, in which $R_6$ has the above significance such that both symbols $R_6$ in the compounds of general Formula IX have the same significance, with lithium aluminum hydride or diborane in a solvent which is inert under the reaction conditions, to give a compound of general Formula IIe,

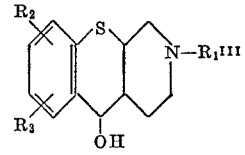

IIe in which $R_2$ and $R_3$ have the above significance, and
$R_1^{III}$ signifies the radical —CH$_2$—R$_6^I$, in which $R_6^I$ signifies a hydrogen atom, or a lower alkyl radical, a cycloalkyl or cyclo alkyl(lower)alkyl radical, in which the cycloalkyl radical contains 3 to 6 ring members, or (f) Converting a compound of general Formula IIf,

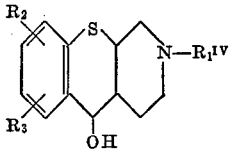

IIf in which $R_2$ and $R_3$ have the above significance, and
$R_1^{IV}$ signifies a lower alkenyl or alkinyl radical, a cycloalkenyl or cycloalkenyl(lower)alkyl radical, in which the cycloalkenyl radical contains 4 to 6 ring members, by catalytic hydrogenation in a solvent which is inert under the reaction conditions, into a compound of general Formula IIg,

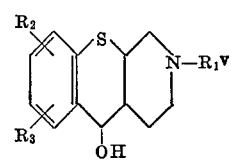

IIg in which $R_2$ and $R_3$ have the above significance, and
$R_1^V$ signifies a lower alkyl radical, a cycloalkyl or cycloalkyl(lower)alkyl radical, in which the cycloalkyl radical contains 4 to 6 ring members, (g) Converting a compound of general Formula IVb,

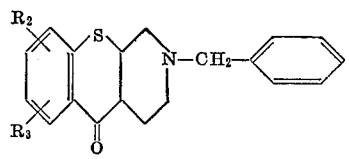

IVb in which $R_2$ and $R_3$ have the above significance, by catalytic hydrogenation and in a solvent which is inert under the reaction conditions, into a compound of general Formula IIb, or (h) Converting compounds of general Formula IIh

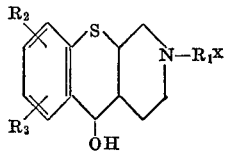

IIh in which $R_2$ and $R_3$ have the above significance, and $R_1{}^x$ signifies a lower alkyl radical containing at least two carbon atoms substituted once or twice on a single carbon atom, or substituted once on each of two adjacent carbon atoms by fluorine, chlorine or bromine, or an alkenyl radical substituted once on one of the carbon atoms of the double bond by fluorine, chlorine or bromine, or a cycloalkyl or cycloalkyl(lower)alkyl radical substituted once in the cycloalkyl ring by fluorine, chlorine or bromine, in which the cycloalkyl radical contains 4 to 6 ring members, into a compound of general Formula IIf by treating with a base in a solvent which is inert under the reaction conditions, or (i) Converting a compound of general Formula IIi,

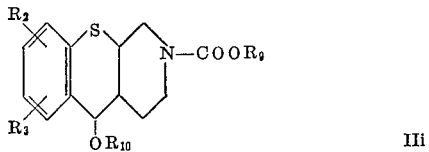

in which $R_2$ and $R_3$ have the above significance, $R_9$ signifies a lower alkyl, the phenyl or benzyl radical, and $R_{10}$ signifies a protective radical generally used for hydroxy radicals, into a compound of general Formula IIb by treating with a base and if necessary splitting off the protective radical $R_{10}$ in a solvent which is inert under the reaction conditions, or (j) Converting a compound of general Formula IIj,

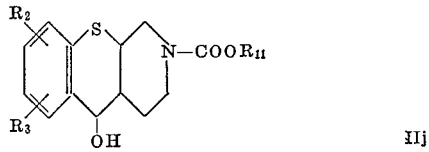

in which $R_2$ and $R_3$ have the above significance, and $R_{11}$ signifies the benzyl radical, by catalytic hydrogenation in a solvent which is inert under the reaction conditions, into a compound of general Formula IIb, and optionally converting any alkoxy radicals which may be present into hydroxy radicals.

The process (a) is preferably effected using sodium borohydride, and lower alkanols such as ethanol or the mixtures of the same with water may be used as solvents.

Hydrogenation catalysts which may be used in process (b) are, for example, platinum, palladium or molybdenum sulphide, and solvents which may be used are preferably lower alkanols such as ethanol or ethanol/hydrochloric acid. When reduction is effected with lithium aluminium hydride it is preferred to us open-chain or cyclic ethers, e.g. tetrahydrofuran or dioxane, as solvents. In this process any alkenyl, alkinyl, or cycloalkenyl radicals which may be present are reduced to the corresponding alkyl or cycloalkyl radicals.

In process (c) a compound of Formula III, in which X signifies a chlorine, bromine or iodine atom, or a methane-, benzene- or p-toluene-sulphonic acid radical, is preferably used. Alkali metal carbonates such as sodium carbonate or potassium carbonate, or tertiary organic bases such as triethylamine may, for example, be used as condensation agents, and lower alkanols such as ethanol, chlorinated hydrocarbons such as chloroform, or aromatic hydrocarbons such as xylene, or di(lower)alkyl substituted acid amides such as dimethyl formamide, may be used as solvents which are inert under the reaction conditions. The condensation is preferably effected at the boiling temperature of the solution and has a duration of about 15 to 25 hours.

In process (d) a reduction of N-alkoxycarbonyl radicals to methyl radicals takes place. Simultaneously in the compounds of general Formula VI the reduction of the keto radical occurs and in the case of the compounds of general Formula VII the splitting of any O-alkoxycarbonyl radicals which may be present occurs. This reduction is preferably effected with lithium aluminium hydride, whereby open-chain or cyclic ethers such as tetrahydrofuran or dioxane may be used as solvents.

In process (e), the N-carbonyl radical as well as any alkenyl, alkinyl or cycloalkenyl radicals which may be present in the starting material, are reduced. In the compounds of general Formula IX a splitting of any O-acyl radicals which may be present furthermore takes place. The reduction is preferably effected in a manner analogous to that indicated in process (d). When compounds of general Formula VIII or IX, in which the substituent $R_6$ signifies an unsaturated grouping, are used in process (e), the amount of reduction agent used will, of course, be adapted to this fact. This also holds good for process (b).

In process (f) lower alkenyl or alkinyl or cycloalkenyl radicals are reduced to the corresponding alkyl or cycloalkyl radicals. Palladium is preferably used as catalyst, and lower alkanols such as ethanol, are suitable solvents.

Process (g), in which reduction of the keto radical and splitting off of the benzyl radical occur simultaneously, is preferably effected with palladium catalysts, optionally on a carrier such as active charcoal, at a pressure above about 10 atmospheres and at a temperature above approximately 50° C.

Alkali metal hydroxides, alkali metal alcoholates, alkali, metal amides or pyridine and quinoline are, for example, used as bases in process (h). Ether or lower alcohols are, for example, used as solvents.

In process (i) alkali metal hydroxides, e.g. sodium hydroxide or potassium hydroxide, which simultaneously decarboxylate the compound of Formula IIi and split off the protective radical $R_{10}$, and preferably used as bases. An acyl radical such as the acetyl or benzoyl radical is preferably used as the protective radical $R_{10}$. Suitable solvents are lower alkanols such as n-butanol, and the process is preferably effected at the boiling temperature of the solvent.

In process (j) palladium on a carrier such as active charcoal is preferably used as catalyst, and a lower alcohol is suitable solvent.

The conversion of any lower alkoxy radicals which may be present in the compounds of Formula II into hydroxy radicals may be effected in a manner analogous to that described for the production of compounds of general Formula I, but the reagents and/or reaction conditions are selected in such a manner that no splitting off of water occurs. Boron tribromide is therefore preferably used as reagent.

The compounds of general Formula II obtained in accordance with processes (a) to (j) may be isolated as free bases or in the form of their salts in the usual manner and purified in manner known per se, e.g. by crystallization from suitable solvents such as ethanol, isopropanol, acetone and hexane.

Racemic compounds of Formula II may be separated into optically active forms in a manner analogous to that described for the compounds of Formula I. Alternatively, if desired stereospecific synthesis may be used.

The starting materials IIb and IIf in processes (c) and (f) are classes of compounds of general Formula II and may be obtained in accordance with process (a) or (b) (IIb), or (a) or (c) (IIf).

The ketones of general Formula IV,

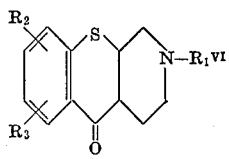

IV in which $R_2$ and $R_3$ have the above significance, and $R_1^{VI}$ signifies a hydrogen atom, a lower alkyl, alkenyl or alkynyl radical, a cycloalkyl, cycloalkenyl, cycloalkyl-(lower)alkyl, cycloalkenyl(lower)alkyl or the benzyl radical, in which the cycloalkyl radical contains 3 to 6 and the cycloalkenyl radical 4 to 6 ring members, and their preparation, including all stereoisomeric forms and their obtention by methods known per se, are also included in the present invention. They may be obtained by (a') Carrying out acyclization procedure on a compound of general Formula X,

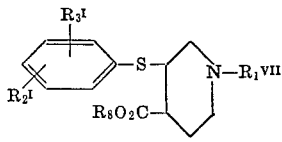

X in which $R_1^{VII}$ signifies a lower alkyl, alkenyl or alkynyl radical, a cycloalkyl, cycloalkenyl, cycloalkyl(lower)alkyl or cycloalkenyl(lower)alkyl radical or the benzyl radical, in which the cycloalkyl radical contains 3 to 6 and the cycloalkenyl radical 4 to 6 ring members, and $R_2^I$ and $R_3^I$ signify a hydrogen or halogen atom, or a lower alkyl or alkoxy radical, and $R_8$ signifies a lower alkyl radical, to give a compound of general Formula IVc,

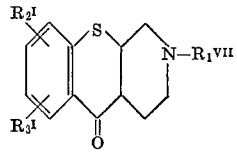

IVc in which $R_1^{VII}$, $R_2^I$ and $R_3^I$ have the above significance, or (b') Converting a compound of general Formula IVd,

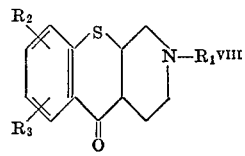

IVd in which $R_2$ and $R_5$ have the above significance, and $R_1^{VIII}$ signifies the methyl or benzyl radical, into a compound of general Formula IVe,

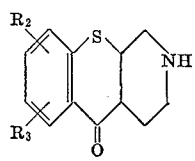

IVe in which $R_2$ and $R_3$ have the above significance, by splitting off the radical $R_1^{VIII}$, or (c') Condensing a compound of general Formula IVe with a compound of general Formula V, $R_1^{VIII}—X$     V in which $R_1^{VIII}$ and X have the above significance, in the presence of a basic condensation agent and in a solvent which is inert under the reaction conditions, to produce a compound of Formula IVh,

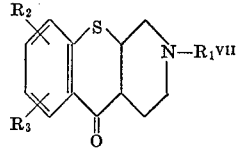

IVh in which $R_2$, $R_3$ and $R_1^{VIII}$ have the above significance, or (d') Converting a compound of general formula IVf,

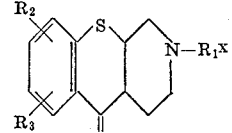

IVf in which $R_2$, and $R_3$ and $R_1^X$ have the above significance, into a compound of general Formula IVg,

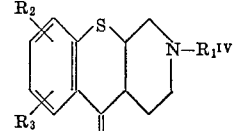

IVg in which $R_1^{IV}$, $R_2$ and $R_3$ have the above significance, by treating with a base in a solvent which is inert under the reaction conditions.

Any lower alkoxy radicals which may be present may be converted into hydroxy radicals at any desired stage after the building up of the [1]benzothiopyrano[2,3-c]pyridine skeleton is completed.

The cyclization in process (a') may be carried out using conventional methods for such cyclizations. It may, for example, be effected directly by treating a compound of general Formula X, optionally in a solvent which is inert under the reaction conditions and/or with heating, with a cyclization agent. Benzene, toluene or tetraline are suitable solvents, and polyphosphoric acid, phosphoric acid or sulphuric acid is preferably used as cyclization agent.

In accordance with a further method of effecting process (a'), an ester of general Formula X is hydrolyzed to an acid of general Formula XI,

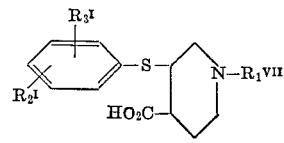

XI in which $R_1^{VII}$, $R_2^I$ and $R_3^I$ have the above significance, this is converted into a compound of general Formula XII,

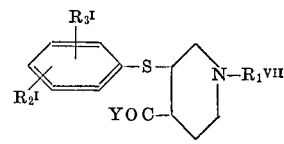

XII in which $R_1^{VII}$, $R_2^I$ and $R_3^I$ have the above significance, and

Y signifies chlorine or bromine, and the compound of general Formula XII is cyclized. Hydrolysis of the esters of general Formula X is effected in manner known per se by heating in the presence of acids or bases. The acids of general Formula XI are converted into the acid halides of general Formula XII by treating with chlorinating or brominating agents such as for example thionyl chloride, phosphorus trichloride, phosphorus pentachloride or dimethylformiminium chloride, and the acid halides of general Formula XII are cyclized with Friedel-Crafts catalysts such as anhydrous aluminium chloride, aluminium bromide or tin tetrachloride, or with acetyl chloride in the presence of sulphuric acid, preferably while heating, to give the compounds of general Formula IVc. This method of preparing compounds of Formula IVc is preferred when in Formula X $R_2^I$ and/or $R_3^I$ signify alkoxy radicals.

The splitting off of the radical $R_1^{VIII}$ from the compounds of Formula IVd in accordance with process (b') may be effected by methods known per se. For example, it may be effected by reacting a compound of general Formula IVd with a chloroformic acid ester of general Formula XIII,

$$Cl—COOR_9 \qquad XIII$$

in which $R_9$ signifies a lower alkyl radical, the phenyl or benzyl radical, and splitting off the —$COOR_9$ radical from the resulting urethane of general Formula XIV,

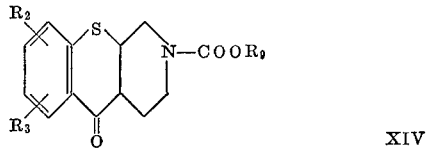
$$XIV$$

in which $R_2$, $R_3$ and $R_9$ have the above significance.

The production of the urethanes of general Formula XIV may, for example, be effected by reacting a compound of general Formula IVd in a solvent which is inert under the reaction conditions, such as anhydrous benzene, with a chloroformic acid ester of general Formula XIII, preferably at the boiling temperature of the solution. The resulting urethanes of general Formula XIV may either be purified in manner known per se or used directly for the following urethane splitting.

The splitting off of the —$COOR_9$ radical from the urethanes of general Formula XIV may be effected with acids such as mineral acids, e.g. hydrochloric acid, or bases such as alkali metal hydroxides, e.g. sodium or potassium hydroxide, in a solvent which is inert under the reaction conditions, such as lower alkanols, e.g. n-butanol, preferably at the boiling temperature of the solution.

The urethanes of general Formula XIV, in which $R_9$ signifies the benzyl radical, may also be split by catalytic hydrogenation. For this catalytic hydrogenation the catalyst and the reaction conditions are chosen in such a manner that a selective reaction with the urethane grouping occurs. Palladium catalysts such as palladium on active charcoal are preferably used and hydrogenation is effected under mild reaction conditions (about room temperature and normal pressure).

Another embodiment of process (b') is characterized in that the radical $R_1^{VIII}$ is split off from the compounds of general Formula IVd by reacting the compound of general Formula IVd with cyanogen bromide and treating the resulting cyanamides with an acid. This embodiment of the process is preferably effected by reacting the compounds of general Formula IVd at an elevated temperature, optionally in a solvent which is inert under the reaction conditions, with cyanogen bromide, purifying the resulting cyanamide in manner known per se if necessary, and converting into the compounds of general Formula IVe by heating with dilute mineral acids.

A further embodiment of process (b') is characterized in that the benzyl radical is split off from the compound of general Formula IVd, in which $R_1^{VIII}$ signifies the benzyl radical, by selective catalytic hydrogenation with palladium on a carrier such as active charcoal at about room temperature and normal pressure. A lower alcohol may, for example, be used as solvent which is inert under the reaction conditions.

Process (c') may be effected by condensing a compound of general Formula IVe in the presence of a basic condensation agent, e.g. an alkali metal carbonate such as sodium or potassium carbonate, or a tertiary organic base such as triethylamine or pyridine, optionally in a solvent which is inert under the reaction conditions, with a compound of general Formula V.

In accordance with another embodiment of process (c') a compound of general Formula IVe is converted into an alkali metal salt by heating with, for example, an alkali metal amide, and the alkali metal salt is reacted with a compound of general Formula V while heating and/or in a solvent which is inert under the reaction conditions. The preferred significance of X in the compounds of Formula V corresponds to that indicated in connection with process (2).

Alkali metal hydroxides, alkali metal alcoholates, alkali metal amides or pyridine or quinoline may, for example, be used as bases in process (d'), and ether or lower alkanols may, for example, be used as solvents.

The optional conversion of any alkoxy radicals which may be present into hydroxy radicals is effected in manner known per se, e.g. by treating the corresponding alkoxy compounds with boron tribromide in a solvent which is inert under the reaction conditions, such as, for example, methylene chloride, at a low temperature, and subsequently subjecting the resulting orthoboric acid esters to hydrolysis. Other reagents with which any lower alkoxy radicals which are present may be converted into hydroxy radicals, are, for example, boron trichloride, hydrogen iodide or pyridinium chloride. This conversion of alkoxy compounds into hydroxy compounds in the processes (a'), (b') (c') and (d') may be effected at any desired stages after the ring closure.

The starting materials of general Formula X, used for the production of the ketones of general Formula IVc (process (a')) may, for example, be produced by reacting an isonicotinic acid ester of general Formula XV,

$$XV$$

in which $R_8$ has the above significance, with a compound of general Formula XVI, $$R_1^{VII}—Y \qquad XVI$$

in which $R_1^{VII}$ and Y have the above significance, to give a pyridinium halide of general Formula XVII,

$$XVII$$

in which $R_1^{VII}$, $R_8$ and Y have the above significance, e.g. by heating the components for several hours in ethanol, reducing the resulting compound of general Formula XVII with sodium borohydride to yield a tetrahydroisonicotinic acid ester of general Formula XVIII,

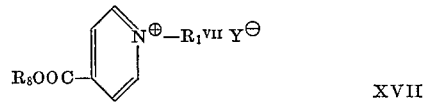
$$XVIII$$

in which $R_4$ has the above significance, and condensing this with a thiophenol of general Formula XIX,

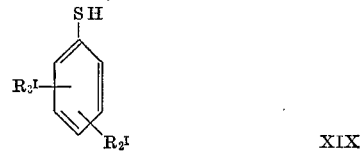
$$XIX$$

in which $R_2^I$ and $R_3^I$ have the above significance.

This condensation is preferably effected in the presence of a basic catalyst such as piperidine, triethylamine, benzyltrimethylammonium hydroxide, and in a solvent which is inert under the reaction conditions, such as ethanol, in an atmosphere of nitrogen, preferably at the boiling temperature of the solution and optionally in the presence of a small amount of hydroquinone.

The starting materials used in processes (i) and (j) may, for example, be produced by reduction of the corresponding N-methyl- or N-benzyl-keto compounds in accordance with process (a) or (b) to yield the corresponding hydroxy compounds, which are converted into the urethanes of general Formula IIi or IIj as described in process (b'), whereby the protective radical $R_{10}$ must additionally be introduced for the production of compounds IIi.

The compounds VI or VII may be obtained by reacting a compound of general Formula IVe or IIb with a compound of general Formula XX, $$Cl\text{—}COOR_4 \qquad XX$$

in which $R_4$ has the above significance,
in the presence of a basic condensation agent, preferably tertiary organic bases such as triethylamine or pyridine, and in a solvent which is inert under the reaction conditions.

The compounds of general Formula VIII or IX may be obtained by reacting a compound of general Formula IVe or IIb with an acid anhydride of general Formula XXI, $$(R_6CO)_2O \qquad XXI$$

in which $R_6$ has the above significance,
or in the presence of a basic condensation agent, e.g. tertiary organic bases such as triethylamine or pyridine, with an acid chloride of general Formula XXII, $$R_6CO\text{—}Cl \qquad XXII$$

in which $R_6$ has the above significance,
optionally in a solvent which is inert under the reaction conditions.

These reactions may yield a mixture of products substituted only on the nitrogen atom by the group $$\text{—}COOR_4$$

or —$COR_6$, and products substituted on both the nitrogen atom and the oxygen atom of the hydroxy group, by the group —$COOR_4$ or —$COR_6$. If desired, any $$\text{—O—}COOR_4$$

or —O—$COR_6$ groups may be split off hydrolytically, e.g. by heating with a solution of potassium hydroxide in a lower alcohol, but this splitting or a separation of the resulting mixtures is not necessary, since a reductive splitting of these groups takes place during the reduction in accordance with processes (d) and (e).

The compounds IIh or IVf used as starting materials in process (h) or (d') may be produced by condensation of a compound IIb or IVe with a compound of general Formula XXIII, $$R_1^x\text{—}A \qquad XXIII$$

in which $R_1^x$ has the above significance, and
A signifies the acid radical of a reactive ester.

The radical A is chosen in such a manner that it will more readily react with the nitrogen atom in the compounds of general Formula IIb or IVe than the halogen present in $R_1^x$. Thus, for example, A may signify bromine when the radical $R_1^x$ contains a chlorine atom.

Any intermediate whose production is not hereinbefore described is either known or may be produced in manner known per se or in a manner analogous to the processes described in this application.

In the compounds of general Formula I the lower alkyl radicals represented by the symbol $R_1$ contain preferably 1 to 6 carbon atoms, the lower alkenyl or alkynyl radicals preferably 2 to 6 carbon atoms, the (lower)alkyl radicals of the cycloalkyl(lower)alkyl and cycloalkenyl(lower)alkyl radicals preferably 1 to 4 carbon atoms, the lower alkyl and alkoxy radicals represented by the symbols $R_2$ and $R_3$ 1 to 6 carbon atoms. The preferred radicals in intermediary compounds either contain the same number of carbon atoms as the corresponding preferred radicals in the final products, or, depending on the processes concerned, contain the number of carbon atoms which would lead to the preferred radicals being present in the final products.

In the following examples which illustrate the invention without in any way limiting its scope, all temperatures are indicated in degrees centigrade and are uncorrected.

EXAMPLE 1

2-methyl-1,3,4,10a-tetrahydro-2H-[1]benzothiopyrano[2,3-c]pyridine 14 g. of 2-methyl - 1,2,3,4,4a,10a - hexahydro-5H-[1] benzothiopyrano[2,3-c]pyridin-5-ol (isomer A, isomer B or mixture of isomers) are heated to the boil in 28 cc. of concentrated hydrochloric acid and 56 cc. of water for 30 minutes. The reaction mixture is subsequently concentrated by evaporation at reduced pressure, and the hydrochloride of the compound indicated in the heading obtained as residue is recrystallized thrice from ethanol; M.P.: decomposition over 254°.

The 2-methyl - 1,2,3,4,4a,10a - hexahydro-5H-[1]benzothiopyrano[2,3-c]pyridin-5-ol, used as starting material, is produced as follows:

(a) A solution of 284 g. of 1-methyl-1,2,5,6-tetrahydroisonicotinic acid ethyl ester, 220 g. of thiophenol and 20 cc. of piperidine in 1.2 liters of ethanol is heated to the boil in an atmosphere of nitrogen for 10 hours. After the addition of a further 10 cc. of piperidine the reaction solution is stirred at the boil for 8 hours, is subsequently concentrated by evaporation at reduced pressure, and the residue is heated to 120–140° at 12 mm. of Hg for 1 hour, in order to remove the diphenyldisulphide obtained as by-product. The residue remaining in the flask is distilled in a high vacuum, whereby 1-methyl-3-phenyl-thioisonipecotinic acid ethyl ester distils over as a light yellow oil at about 148–155°/0.1 mm. of Hg (mixture of isomers); M.P. of the hydrochloride 175–178° after crystallization from acetone.

(b) 83.0 g. of 1 - methyl-3-phenyl-thioisonipecotinic acid ethyl ester (mixture of isomers) are added to 500 g. of polyphosphoric acid at 150° in an atmosphere of nitrogen during the course of 1½ hours, the mixture is heated to 150° while stirring for a further 30 minutes, the dark brown solution is subsequently allowed to cool to about 100° and is then poured into 1.5 liters of water. The resulting suspension is extracted twice with ether, is cooled to 10° and then carefully saturated with solid potassium carbonate at 10–15° while stirring vigorously. The mixture is extracted thrice with methylene chloride, the combined organic phases are washed with water and dried over sodium sulphate. After evaporating the solvent the residue is distilled in a high vacuum, whereby 2-methyl-1,2,3,4,4a,10a - hexahydro - 5H - [1]benzothiopyrano[2,3-c]pyridin-5-one distils over at 145–153°/0.02 mm. of Hg. The compound is a red, viscous oil, which rapidly crystallizes and is sensitive to oxygen as crude product. It is immediately recrystallized as base from methanol or as hydrochloride from isopropanol. The compound is stable as pure product. M.P. of the free base 95–96°; M.P. of the hydrochloride 304–305°.

(c) A solution of 6.8 g. of sodium borohydride in 26 cc. of water and 0.6 cc. of a 40% solution of caustic soda are added dropwise at 30–40° to a solution of 20 g. of 2 - methyl - 1,2,3,4,4a,10a - hexahydro - 5H - [1]benzothiopyrano[2,3-c]pyridin-5-one in 150 cc. of ethanol, the reaction solution is stirred at 40° for 1½ hours and subsequently at 70° for 2 hours. 30 cc. of methanol are then added and stirring is continued at 70° for 30 minutes. After cooling the reaction mixture is evaporated to dryness at reduced pressure, the residue is shaken out between 1.5 liters of chloroform and 1.2 liters of water, the aqueous solution is separated and again shaken out with chloroform. The combined chloroform solutions are washed with water, dried over magnesium sulphate and concentrated by evaporation, whereby 2 - methyl - 1,2,3,4,4a,10a - hexahydro - 5H - [1]benzothiopyrano[2,3-c]pyridin-5-ol (mixture of isomers) is obtained as residue; after dissolving in ether and precipitating with hexane the M.P. is 150–175° (sintering over 127°).

The isomer A may be separated from this mixture by fractional crystallization from isopropanol; M.P. 193–194°. The isopropanol mother liquors are evaporated to dryness and the residue is recrystallized thrice from ether, whereby the isomer B, having a M.P. of 129–130°, is obtained.

EXAMPLE 2

1,3,4,10a-tetrahydro-2H-[1]benzothiopyrano [2,3-c]pyridine

A solution of 13 g. of 1,2,3,4,4a,10a-hexahydro-5H-[1] benzothiopyrano[2,3-c]pyridin-5-ol (mixture of isomers) in 26 cc. of concentrated hydrochloric acid and 52 cc. of water is heated to the boil for 30 minutes. After cooling the mixture to 10° the precipitated hydrochloride of the compound indicated in the heading is filtered off and the mother liquor is concentrated to half its volume at reduced pressure, whereby a second portion of the above hydrochloride precipitates and may be filtered off. The pure product has a M.P. of 256–259° after recrystallizing twice from methanol/ethanol.

The 1,2,3,4,4a,10a - hexahydro - 5H - [1]benzothiopyrano[2,3-c]pyridin-5-ol, used as starting material, may be produced as follows:

(a) A solution of 32 g. of chloroformic acid ethyl ester in 50 cc. of absolute benzene is added dropwise at 20–25° during the course of 30 minutes to a solution of 20 g. of 2-methyl - 1,2,3,4,4a,10a - hexahydro - 5H - [1]benzothiopyrano[2,3-c]pyridin-5-one [production see Example 1, section (b)] in 200 cc. of absolute benzene. The resulting turbid solution is heated to the boil for 3 hours, is then cooled, is first washed with dilute hydrochloric acid and then with water, is dried over magnesium sulphate and concentrated by evaporation at reduced pressure. The crude 2-ethoxycarbonyl - 1,2,3,4,4a,10a - hexahydro-5H- [1]benzothiopyrano[2,3-c]pyridin-5-one obtained as a viscous yellow oil is dried at 100°/12 mm. of Hg for 3 hours; $n_D^{24} = 1.5693$. M.P. of the solidified compound 95–96° after recrystallization from ethanol.

(b) 20 g. of crude 2-ethoxycarbonyl-1,2,3,4,4a,10a- hexahydro - 5H - [1]benzothiopyrano[2,3-c]pyridin-5-one are heated to the boil with 500 cc. of 5 N hydrochloric acid for 20 hours in an atmosphere of nitrogen. After cooling to 20° the acid aqueous solution is decanted; the undissolved portion is taken up in a further 500 cc. of 5 N hydrochloric acid and is heated to the boil in an atmosphere of nitrogen until the material dissolves completely (20–30 hours). The combined hydrochloric acid solutions are treated with a small amount of active charcoal, are filtered and evaporated to dryness at reduced pressure. After recrystallizing the residue twice from 1–1.5 liters of methanol pure 1,2,3,4,4a,10-hexahydro-5H-[1]- benzothiopyrano[2,3-c]pyridin-5-one hydrochloride, having a M.P. of 302–303°, is obtained.

(c) 1,2,3,4,4a,10 - hexahydro-5H-[1]benzothiopyrano- [2,3-c]pyridin-5-ol (mixture of isomers), having a M.P. of 158–164° (from acetone), is obtained in accordance with the process described in Example 1, section (c), from 13 g. of 1,2,3,4,4a,10a-hexahydro-5H-[1]benzothiopyrano[2,3-c]pyridin-5-one in 150 cc. of ethanol and 4.6 g. of sodium borohydride in 14 cc. of water and 0.4 cc. of a 40% solution of caustic soda.

EXAMPLE 3

2,7-dimethyl-1,3,4,10a-tetrahydro-2H-[1]benzothiopyrano[2,3-c]pyridine

The hydrochloride of the compound indicated in the heading is produced in accordance with the process described in Example 1 by heating 12 g. of 2,7-dimethyl-1,2,3,4,4a,10a-hexahydro-5H-[1]benzothiopyrano[2,3 - c] pyridin-5-ol (mixture of isomers) in 24 cc. of concentrated hydrochloric acid and 48 cc. of water; M.P. 246–249° after crystallization from isopropanol.

The 2,7 - dimethyl - 1,2,3,4,4a,10a - hexahydro-5H-[1]- benzothiopyrano[2,3-c]pyridin-5-ol, used as starting material, may be produced as follows:

(a) 1-methyl-3-(4-tolylthio)-isonipecotinic acid ethyl ester (mixture of isomers) is obtained in a manner analogous to that described in Example 1, section (a), from 113.5 g. of 1-methyl-1,2,5,6-tetrahydro-isonicotinic acid ethyl ester, 100 g. of p-thiocresol and 17 cc. of piperidine in 500 cc. of ethanol; B.P. 158–164°/0.01 mm. of Hg.

(b) 2,7 - dimethyl - 1,2,3,4,4a,10a - hexahydro-5H-[1]- benzothiopyrano[2,3-c]pyridin-5-one is produced in accordance with the process described in Example 1, section (b), from 50 g. of 1-methyl-3-(4-tolylthio)-isonipecotinic acid ethyl ester and 500 g. of polyphosphoric acid by heating to 150° for 2 hours. B.P. 175–185°/0.4 mm. of Hg. The crude product is sensitive to oxygen and is immediately recrystallized from ether; M.P. 139–144° (M.P. of the hydrochloride 290–295° from methanol).

(c) 2,7 - dimethyl - 1,2,3,4,4a,10a - hexahydro-5H-[1]- benzothiopyrano[2,3-c]pyridin-5-ol is obtained as a mixture of isomers having a M.P. of 146–160° (from ether) in accordance with the process described in Example 1, section (c), from 15 g. of 2,7-dimethyl-1,2,3,4,4a,10a- hexahydro - 5H - [1]benzothiopyrano[2,3-c]pyridin-5-one in 120 cc. of ethanol and 4.9 g. of sodium borohydride, 18 cc. of water and 0.6 cc. of a 40% solution of caustic soda; the isomer A has a M.P. of 166–168° (from isopropanol).

EXAMPLE 4

7-chloro-2-methyl-1,3,4,10a-tetrahydro-2H-[1]benzothiopyrano[2,3-c]pyridine

The hydrochloride of the compound indicated in the heading, having a M.P. of 277–278° (from methanol), is obtained in accordance with the process described in Example 1 from 8 g. of 7-chloro-2-methyl-1,2,3,4,4a,10a- hexahydro - 5H - [1]benzothiopyrano[2,3 - c]pyridin-5-ol (mixture of isomers) by heating in 16 cc. of concentrated hydrochloric acid and 32 cc. of water.

The 7 - chloro - 2-methyl-1,2,3,4,4a,10a-hexahydro-5H- [1]benzothiopyrano[2,3-c]pyridin-5-ol, used as starting material, may be produced as follows:

(a) 1 - methyl - 3 - (4-chlorophenylthio)-isonipecotinic acid ethyl ester is produced in accordance with the process described in Example 1, section (a), from 100 g. of 1-methyl-1,2,5,6-tetrahydroisonicotinic acid ethyl ester, 100 g. of p-chlorothiophenol and 10 cc. of piperidine in 600 cc. of ethanol with the addition of 0.5 g. of hydroquinone; B.P. 195–205°/0.5 mm. of Hg. One of the two components may be separated in pure form from the resulting isomer mixture by crystallization from petroleum ether; M.P. 61–62°.

(b) The production of 7-chloro-2-methyl-1,2,3,4,4a, 10a - hexahydro - 5H - [1]benzothiopyrano[2,3-c]pyridin- 5-one is effected in accordance with the process described in Example 1, section (b), by adding 80 g. of 1-methyl-3- (4-chlorophenylthio)-isonipecotinic acid ethyl ester to 500 g. of polyphosphoric acid at 120° during the course of 2 hours and stirring the mixture at the same temperature for a further 8 hours. The resulting product (B.P.

161–170°/0.03 mm. of Hg) is obtained as mixture of isomers, from which one of the two components readily crystallizes in pure form from ether; M.P. 149–150°.

(c) 7 - chloro - 2 - methyl - 1,2,3,4,4a,10a-hexahydro-5H-[1]benzothiopyrano[2,3-c]pyridin-5-ol is obtained as a mixture of isomers having a M.P. of 160–172° (from ether), in accordance with the process described in Example 1, section (c), from 15 g. of 7-chloro-2-methyl-1,2,3,4,4a,10a - hexahydro - 5H - [1]benzothiopyrano[2,3-c]-pyridin-5-one in 100 cc. of ethanol and 4.5 g. of sodium borohydride in 17 cc. of water and 0.4 cc. of a 40% solution of caustic soda. The isomer A has a M.P. of 175–176° (from isopropanol).

EXAMPLE 5

8-chloro-2-methyl-1,3,4,10a-tetrahydro-2H-[1]benzo-thiopyrano[2,3-c]pyridine

The hydrochloride of the compound indicated in the heading, having a M.P. of 309–311° (decomp.) after crystallization from methanol, is obtained in accordance with the process described in Example 2, from 12 g. of 8 - chloro - 2-methyl - 1,2,3,4,4a,10a - hexahydro-5H-[1]-benzothiopyrano[2,3-c]pyridin-5-ol (mixture of isomers) by heating in 24 cc. of concentrated hydrochloric acid and 48 cc. of water.

The 8 - chloro - 2-methyl-1,2,3,4,4a,10a-hexahydro-5H-[1]benzothiopyrano[2,3-c]pyridin-5-ol, used as starting material, may be obtained as follows:

(a) 1-methyl-3-(3-chlorophenylthio)-isonipecotinic acid ethyl ester is obtained in accordance with the process described in Example 1, section (a), from 100 g. of 1-methyl-1,2,5,6-tetrahydroisonicotinic acid ethyl ester, 100 g. of m-chlorothiophenol and 10 cc. of piperidine in 600 cc. of ethanol with the addition of 0.5 g. of hydroquinone; B.P. 155–160°/0.4 mm. of Hg. The α form is crystallized from ethanol as hydrochloride having a M.P. of 112–115°, and the β form is isolated as hydrogen fumarate having a M.P. of 110–112° (from ethanol) from the resulting mixture of isomers.

(b) 8-chloro-2-methyl - 1,2,3,4,4a,10a - hexahydro-5H-[1]benzothiopyrano[2,3-c]pyridin-5-one is produced in accordance with the process described in Example 1, section (b), from 50 g. of 1-methyl-3-(3-chloro-phenylthio)-isonipecotinic acid ethyl ester and 700 g. of polyphosphoric acid by heating to 150° for 2 hours; B.P. 145–155°/0.02 mm. of Hg. The resulting product is obtained as a mixture of isomers, from which one of the components may be crystallized from benzene/petroleum ether in pure form, having a M.P. of 111–113°; the hydrochloride has an M.P. of 305° (decomposition after crystallization from methanol).

(c) 8-chloro - 2 - methyl-1,2,3,4,4a,10a-hexahydro-5H-[1]benzothiopyrano[2,3-c]pyridin-5-ol may be obtained as mixture of isomers in accordance with the process described in Example 1, section (c), from 15 g. of 8-chloro-2-methyl - 1,2,3,4,4a,10a - hexahydro - 5H - [1]benzothiopyrano[2,3-c]pyridin-5-one in 1500 cc. of ethanol and 4.6 g. of sodium borohydride in 18 cc. of water and 0.8 cc. of a 40% solution of caustic soda; M.P. 165–170° (from isopropanol).

EXAMPLE 6

7-bromo-2-methyl-1,3,4,10a-tetrahydro-2H-[1]benzothiopyrano[2,3-c]pyridine

The hydrochloride of the compound indicated in the heading, having a M.P. of 298–301° (decomposition after crystallization from methanol), is obtained in accordance with the process described in Example 2, from 12 g. of 7-bromo-2-methyl-1,2,3,4,4a,10a-hexahydro - 5H - [1] benzothiopyrano[2,3-c]pyridin-5-ol (mixture of isomers) by heating in 24 cc. of concentrated hydrochloric acid and 48 cc. of water; the base has an M.P. of 105–108° (from ether).

The 7-bromo-2-methyl-1,2,3,4,4a,10a-hexahydro - 5H-[1]benzothiopyrano[2,3-c]pyridin-5-ol used as starting material may be produced as follows:

(a) 1 - methyl - 3 - (4-bromophenylthio)-isonipecotinic acid ethyl ester is produced in accordance with the process described in Example 1, section (a), from 134 g. of 1-methyl-1,2,5,6-tetrahydroisonicotinic acid ethyl ester, 191 g. of p-bromothiophenol and 22 cc. of piperidine in 850 cc. of ethanol with the addition of 0.8 g. of hydroquinone; B.P. 170–175°/0.3 mm. of Hg. One of the two components may be isolated in pure form from the resulting mixture of isomers by crystallization from petroleum ether. M.P. 53.5–54.5°.

(b) 7-bromo-2-methyl - 1,2,3,4,4a,10a - hexahydro-5H-[1]benzothiopyrano[2,3-c]pyridin-5-one is obtained in accordance with the process described in Example 1, section (b), from 89 g. of 1-methyl-3-(4-bromophenylthio)-isonipecotinic acid ethyl ester and 750 g. of polyphosphoric acid at 120°. After the working up the residue is crystallized from methanol without previous distillation, whereby the pure α form, having an M.P. of 167–169°, is obtained. A mixture of isomers may be crystallized from the mother liquor as hydrochloride having an M.P. of 300–305° (decomp.).

(c) 7-bromo-2-methyl - 1,2,3,4,4a,10a - hexahydro-5H-[1]benzothiopyrano[2,3-c]pyridin-5-ol is obtained as mixture of isomers, having an M.P. of 190–194° (from isopropanol), in accordance with the process described in Example 1, section (c), from 15 g. of 7-bromo-2-methyl-1,2,3,4,4a,10a-hexahydro - 5H-[1]benzothiopyrano[2,3c-]pyridin-5-one in 200 cc. of ethanol and 3.9 g. of sodium borohydride in 15 cc. of water and 0.5 cc. of a 40% solution of caustic soda.

EXAMPLE 7

7-methoxy-2-methyl-1,3,4,10a-tetrahydro-2H-[1]benzothiopyrano[2,3-c]pyridine

A solution of 15 g. of 7-methoxy-2-methyl-1,2,3,4,4a,10a-hexahydro - 5H - [1]benzothiopyrano[2,3-c]pyridin-5-ol (mixture of isomers) in 50 cc. of concentrated hydrochloric acid and 100 cc. of glacial acetic acid is heated to the boil for 1 hour. The reaction solution is subsequently evaporated to dryness at reduced pressure, the residue is taken up in 100 cc. of absolute ethanol, the resulting solution is treated with active charcoal, and is concentrated by evaporation at 12 mm. of Hg. The dried residue is triturated with acetone, is filtered and the filter residue is crystallized thrice from methanol, whereby the hydrochloride of the compound indicated in the heading, having an M.P. of 220–224° (decomp.), is obtained.

The 7 - methoxy-2-methyl-1,2,3,4,4a,10a-hexahydro-5H-[1]benzothiopyrano[2,3-c]pyridin-5-ol, used as starting material, may be produced as follows:

(a) 1-methyl-3-(4-methoxyphenylthio) - isonipecotinic acid ethyl ester (mixture of isomers) may be obtained in a manner analogous to that described in Example 1, section (a), from 134 g. of 1-methyl-1,2,5,6-tetrahydro-isonicotinic acid ethyl ester, 134 g. of p-methoxythiophenol, 13 cc. of piperidine and 0.5 g. of hydroquinone in 530 cc. of ethanol; B.P. 186–190°/0.2 mm. of Hg.

(b) A solution of 50 g. of 1-methyl-3-(4-methoxyphenylthio)-isonipecotinic acid ethyl ester in 100 cc. of water and 130 cc. of concentrated hydrochloric acid is heated to the boil in a distillation apparatus for about 2 hours until its volume amounts to about 70 cc. The solution is subsequently evaporated to dryness at reduced pressure, 200 cc. of absolute ethanol are added to the residue, the mixture is again concentrated at reduced pressure and the residue is dried. The resulting crude 1-methyl-3-(4-methoxyphenylthio)-isonipecotinic acid hydrochloride is carefully taken up in 300 cc. of absolute thionyl chloride at 0–10°, and the resulting yellow solution is stirred at room temperature for about 10–15 hours. 750 cc. of tetrachloroethane are then added and the resulting solution is concentrated to half its volume at normal pressure. The resulting solution is added dropwise at 20–30° during the course of 2 hours and while stirring well to a suspension of 45 g. of aluminium chloride in 100 cc. of tetrachloroethane and the reaction mixture is stirred at 40° for 1 hour and at 60° for 30 minutes. After cooling the reaction mixture is poured into a mixture of 120 cc. of concentrated hydrochloric acid and 1.5 liters of water, is stirred thoroughly and the aqueous solution is extracted thrice with ether. A 50% caustic potash solution is added to the aqueous solution while cooling until a strong alkaline reaction is obtained, and the turbid mixture is extracted several times with methylene chloride. After drying the combined organic phases over sodium sulphate and evaporating the solvent, the residue is crystallized from methanol, whereby 7-methoxy - 2 - methyl-1,2,3,4,4a,10a-hexahydro-5H - [1]benzothiopyrano[2,3-c]pyridin-5-one, having an M.P. of 106–110°, is obtained. After recrystallizing several times from methanol, the M.P. rises to 115–116°.

(c) 7-methoxy-2-methyl-1,2,3,4a,10a-hexahydro - 5H-[1]benzothiopyrano[2,3-c]pyridin-5-ol (mixture of isomers) is produced in accordance with the process described in Example 1, section (c), from 15 g. of 7-methoxy-2-methyl-1,2,3,4,4a,10a-hexahydro-5H - [1]benzothiopyrano [2,3-c]pyridin-5-one in 130 cc. of ethanol and 4.5 g. of sodium borohydride in 13.5 cc. of water and 0.4 cc. of a 40% solution of caustic soda. M.P. 148–154° (from isopropanol). The isomer A has a M.P. of 154–155° (from isopropanol).

EXAMPLE 8

2-n-butyl-1,3,4,10a-tetrahydro-2H-[1]benzothiopyrano [2,3-c]pyridine

The hydrochloride of the compound indicated in the heading, having a M.P. of 235–237° (from ethanol), is obtained in accordance with the process described in Example 1 from 10 g. of 2-n-butyl-1,2,3,4,4a,10a-hexahydro-5H-[1]benzothiopyrano[2,3-c]pyridin-5-ol (mixture of isomers) by heating in 20 cc. of concentrated hydrochloric acid and 40 cc. of water.

The 2-n-butyl-1,2,3,4,4a,10a-hexahydro-5H - [1]benzothiopyrano[2,3-c]pyridin-5-ol, used as starting material, may, for example, be produced as follows:

(a) 16 g. of anhydrous sodium carbonate and 10.5 g. of n-butylbromide are added to a solution of 15 g. of 1,2,3,4,4a,10a-hexahydro-5H-[1]benzothiopyrano[2,3 - c]pyridin-5-one [production see Example 2, section (b)] in 300 cc. of absolute xylene. The reaction mixture is heated to the boil for 20 hours, is subsequently cooled, washed thrice with water and shaken out several times with a 2 N aqueous tartaric acid solution. A concentrated solution of caustic soda is added to the acid extracts at 15–20° until a strongly alkaline reaction is obtained (pH 14), and the resulting suspension is extracted several times with methylene chloride. The combined organic phases are washed with water, dried over sodium sulphate and concentrated by evaporation at reduced pressure. After recrystallizing the residue several times from ether pure 2-butyl-1,2,3,4,4a,10a-hexahydro-5H - [1]benzothiopyrano[2,3 - c]pyridin-5-one, having a M.P. of 87–88°, is obtained.

The same compound may also be obtained in the following manner:

(a') 7 g. of 1,2,3,4,4a,10a-hexahydro-5H-[1]benzothiopyrano[2,3-c]pyridin-5-one and 1.3 g. of sodium amide are stirred in 100 cc. of absolute toluene at 120° for 45 minutes. After cooling a solution of 4.9 of n-butylbromide in 30 cc. of absolute toluene is added dropwise at 50–60°, the reaction mixture is heated to the boil for 1 hour and after cooling is worked up in a manner analogous to that described above. The product has a M.P. 87–88° (from ether).

(b') 2-n-butyl-1,2,3,4,4a,10a-hexahydro-5H-[1]benzothiopyrano[2,3-c]pyridin-5-ol is obtained as a mixture of isomers having a M.P. of 128–135° (from ether) in accordance with the process described in Example 1, section (c), from 12 g. of 2-n-butyl-1,2,3,4,4a,10a-hexahydro-5H-[1]benzothiopyrano[2,3-c]pyridin-5-one in 85 cc. of ethanol and 3.2 g. of sodium borohydride in 13 cc. of water and 0.3 cc. of a 40% caustic soda solution.

EXAMPLE 9

2-n-propyl-1,3,4,10a-tetrahydro-2H-[1]benzothiopyrano [2,3-c]pyridine

The hydrochloride of the compound indicated in the heading, having a M.P. of 227–228° (from ethanol), is obtained in accordance with the process described in Example 1, from 12 g. of 2-n-propyl-1,2,3,4,4a,10a-hexahydro-5H-[1]benzothiopyrano[2,3-c]pyridin-5-ol (mixture of isomers) by heating in 25 cc. of concentrated hydrochloric acid and 50 cc. of water.

The 2-n-propyl-1,2,3,4,4a,10a-hexahydro-5H-[1]benzothiopyrano[2,3-c]pyridin-5-ol, used as starting material, may be produced as follows:

(a) A solution of 6.2 g. of propionyl chloride in 30 cc. of absolute benzene is added dropwise at 20–25° during the course of 1 hour to a solution of 14.0 g. of 1,2,3,4,5-one [production see Example 2, section (b)] and 6.8 4a,10a-hexahydro-5H - [1]benzothiopyrano[2,3 - c]pyridin-5-one [production see Example 2, section (b)] and 6.8 g. of triethylamine in 240 cc. of absolute benzene, the resulting turbid solution is stirred at 20° for 1 hour and at 50° for 2 hours and is subsequently allowed to cool to 15°. The precipitated triethylamine hydrochloride is filtered off and washed several times with benzene. The combined filtrates are washed with water, dried over magnesium sulphate and concentrated by evaporation at reduced pressure. The 2-propionyl-1,2,3,4,4a,10a-hexahydro-5H-[1]benzothiopyrano[2,3-c]pyridin-5-one, obtained as residue, is recrystallized from ethanol; M.P. 131–132°.

(b) A solution of 14 g. of the product obtained in section (a) in 80 cc. of absolute tetrahydrofuran is added dropwise at room temperature during the course of 2 hours to a suspension of 8.5 g. of lithium aluminium hydride in 350 cc. of absolute tetrahydrofuran. The reaction mixture is heated to the boil for 12 hours, is cooled to 0°, and 45 cc. of a saturated aqueous sodium sulphate solution are added dropwise at 0–5°. The precipitate is separated by filtration and extracted thrice with boiling tetrahydrofuran. The combined filtrates are concentrated by evaporation at reduced pressure, whereby 2-n-propyl-1,2,3,4,4a,10a-hexahydro-5H - [1]benzothiopyrano[2,3 - c]pyridin-5-ol (mixture of isomers) is obtained as residue. M.P. 120–132° (from methanol). The isomer A has a M.P. of 136–138° (from isopropanol).

EXAMPLE 10

7,8-dimethoxy-2-methyl-1,3,4,10a-tetrahydro-2H-[1] benzothiopyrano[2,3-c]pyridine A suspension of 10 g. of 7,8-dimethoxy-2-methyl-1,2,3 4,4a,10a-hexahydro-5H-[1]benzothiopyrano[2,3 - c]pyridin-5-ol (mixture of isomers) in 30 cc. of isopropanol is heated to 50° and 15 cc. of a 4.7 N solution of hydrogen chloride in isopropanol are added. The starting material dissolves and the final product slowly crystallizes as hydrochloride. The mixture is stirred at 50° for a further 5 minutes, is cooled in an ice bath, the compound which crystallizes is filtered off, is washed with acetone and recrystallized from methanol, whereby the hydrochloride of the compound indicated in the heading, having a M.P. of 262–263° (decomp.), is obtained.

The 7,8-dimethoxy-2-methyl-1,2,3,4,4a,10a-hexahydro-5H-[1]benzothiopyrano[2,3-c]pyridin-5-ol, used as starting material, may be produced as follows:

(a) 1-methyl-3-(3,4-dimethoxyphenylthio) - isonipecotinic acid ethyl ester (mixture of isomer) is obtained

21 in a maner analogous to that described in Example 1, section (a), from 61 g. of 1-methyl-1,2,5,6-tetrahydroisonicotinic acid ethyl ester, 74.4 g. of 3,4-dimethoxythiophenol, 11 cc. of piperidine and 0.2 g. of hydroquinone in 320 cc. of ethanol; the compound has a B.P. of 171–174°/ 0.2 mm. of Hg.

(b) 28 g. of 1-methyl-3-(3,4-dimethoxyphenylthio)-isonipecotinic acid ethyl ester in 50 cc. of water and 65 cc. of concentrated hydrochloric acid are hydrolyzed in accordance with the process described in Example 7, section (b), the resulting 1-methyl-3,(3,4-dimethoxyphenylthio)-isonipecotinic acid hydrochloride is converted into the corresponding acid chloride with 150 cc. of thionyl chloride and then cyclized with 27 g. of aluminum chloride in tetrachloroethane to give 7,8-dimethoxy-2-methyl-1,2,3,4,4a,10a-hexahydro-5H - [1]benzothiopyrano[2,3-c]pyridin-5-one, having a M.P. of 127–129° (from methanol).

(c) 7,8-dimethoxy - 2 - methyl-1,2,3,4,4a,10-a-hexahydro-5H-[1]benzothiopyrano[2,3-c]pyridin-5-ol (mixture of isomers) is produced in accordance with the process described in Example 1, section (c), from 20 g. of 7,8-dimethoxy - 2 - methyl-1,2,3,4,4a,10a-hexahydro-5H-[1]benzothiopyrano[2,3-c]pyridin-5-one in 160 cc. of ethanol and 5.4 g. of sodium borohydride in 16 cc. of water and 0.5 cc. of a 40% solution of caustic soda. M.P. 155–161° (from methanol). The isomer A has a M.P. of 186–187° (from methanol).

EXAMPLE 11

2-ethyl-1,3,4,10a-tetrahydro-2H-[1]
benzothiopyrano[2,3-c]pyridine 19 g. of 2-ethyl-1,2,3,4,4a,10a-hexahydro-5H-[1]benzothiopyrano[2,3-c]pyridin-5-ol (mixture of isomers) are heated to the boil for 1 hour in 40 cc. of concentrated hydrochloric acid and 80 cc. of water. The hot reaction solution is decanted from the small black residue, is concentrated by evaporation at reduced pressure, and the hydrochloride of the compound indicated in the heading, obtained as residue, is recrystallized thrice from isopropanol; M.P. 184–185°.

The 2-ethyl-1,2,3,4,4a,10a-hexahydro-5H-[1]benzothiopyrano[2,3-c]pyridin-5-ol, used as starting material, is produced as follows:

(a) 6.8 g. of triethylamine are added to a solution of 14 g. of 1,2,3,4,4a,10a-hexahydro-5H-[1]benzothiopyrano[2,3-c]pyridin-5-one [production see Example 2, section (b)] in 240 cc. of absolute benzene, and a solution of 5.4 g. of acetyl chloride in 30 cc. of absolute benzene is then added dropwise at 20–25°. The reaction solution is stirred at room temperature for 1 hour and at 50° for 2 hours and is then cooled to 15°. The precipitated triethylamine hydrochloride is filtered off and washed several times with benzene. The combined filtrates are washed with a saturated common salt solution, are dried over magnesium sulphate and concentrated by evaporation at reduced pressure. The 2-acetyl-1,2,3,4,4a,10a-hexahydro-5H-[1]benzothiopyrano[2,3-c]pyridin-5-one, obtained as residue, is recrystallized from benzene. M.P. 182–183°.

(b) A solution of 15 g. of 2-acetyl-1,2,3,4,4a,10a-hexahydro-5H-[1]benzothiopyrano[2,3-c]pyridin-5-one in 200 cc. of absolute tetrahydrofuran is added dropwise during the course of 2 hours to a suspension of 9.5 g. of lithium aluminium hydride in 350 cc. of absolute tetrahydrofuran. The reaction mixture is then heated to the boil for 12 hours, is cooled to 0°, and 51 cc. of a saturated aqueous sodium sulphate solution are added dropwise at 0–5°. The precipitate is filtered and extracted thrice with boiling tetrahydrofuran. The combined filtrates are concentrated by evaporation at reduced pressure, whereby 2-ethyl-1,2,3,4,4a,10a - hexahydro-5H-[1]benzothiopyrano[2,3-c]pyridin-5-ol (mixture of isomers) is obtained as a solid residue. The isomer A has a M.P. of 121–122° (from isopropanol).

22

EXAMPLE 12

2-isopropyl-1,3,4,10a-tetrahydro-2H-
[1]benzothiopyrano[2,3-c]pyridine

A solution of 13.0 g. of isopropyl bromide in 20 cc. of dimethylformamide is added dropwise at 20–40° during the course of 30 minutes to a suspension of 11.9 g. of 1,3,4,10a - tetrahydro-2H-[1]benzothiopyrano[2,3-c]pyridine hydrochloride (production see Example 2) and 10.6 g. of anhydrous sodium carbonate in 60 cc. of dimethylformamide. The reaction mixture is then stirred at 100° for 14 hours, is cooled to 20° and poured into 350 cc. of water. The resulting white suspension is extracted several times with methylene chloride, the extracts are washed with water, dried over sodium sulphate and the solvent is evaporated at reduced pressure. The oily residue is dissolved in 40 cc. of ethanol and the pH of the solution is adjusted to 2 with a 7 N solution of hydrogen chloride in isopropanol. The hydrochloride of the title compound which crystallizes is filtered off and recrystallized from methanol/ethanol. M.P. 261–263°.

EXAMPLE 13

2-allyl-1,3,4,10a-tetrahydro-2H-[1]
benzothiopyrano[2,3-c]pyridine

A solution of 6.2 g. of allyl bromide in 15 cc. of dimethyl formamide is added dropwise at 100° during the course of 3 hours to a suspension of 11.9 g. of 1,3,4,10a-tetrahydro-2H-[1]benzothiopyrano[2,3-c]pyridine hydrochloric (production see Example 2) and 10.6 g. of anhydrous sodium carbonate in 70 cc. of dimethylformamide. The reaction mixture is stirred at 100° for a further hour, is cooled to 15° and poured into 300 cc. of an ice-cold saturated sodium chloride solution. The resulting solution is extracted with methylene chloride, the organic phase is washed with a saturated sodium chloride solution, is dried over magnesium sulphate and the solvent is evaporated at reduced pressure. The resulting oil is dissolved in 40 cc. of ethanol, the pH of the solution is adjusted to 2 with a 7 N solution of hydrogen chloride in isopropanol and the hydrochloride of the compound indicated in the heading, which crystallizes, is filtered off and recrystallized from methanol/isopropanol. M.P. 232–234°.

EXAMPLE 14

2-propargyl-1,3,4,10a-tetrahydro-2H-
[1]benzothiopyrano[2,3-c]pyridine

The base of the compound indicated in the heading, having a M.P. of 89–90° (from ethanol), is obtained in accordance with the process described in Example 13 from 10 g. of 1,3,4,10a - tetrahydro-2H-[1]benzothiopyrano[2,3-c]pyridine hydrochloride, 9.0 g. of anhydrous sodium carbonate in 60 cc. of dimethylformamide and 5.2 g. of propargyl bromide in 15 cc. of dimethylformamide.

EXAMPLE 15

2-isobutyl-1,3,4,10a-tetrahydro-2H-
[1]benzothiopyrano[2,3-c]pyridine

A solution of 12 g. of 2-isobutyl-1,2,3,4,4a,10a-hexahydro-5H-[1]benzothiopyrano[2,3-c]pyridin-5-ol in 48 cc. of concentrated hydrochloric acid and 100 cc. of water is heated to the boil for 1 hour and cooled to 5° while stirring. The hydrochloride of the title compound which crystallizes is filtered off and recrystallized twice from ethanol. M.P. 247–249°.

The 2-isobutyl - 1,2,3,4,4a,10a - hexahydro-5H-[1]-benzothiopyrano[2,3-c]pyridin - 5 - ol, used as starting material, may be produced as follows:

(a) A mixture of 12.3 g. of 1,2,3,4,4a,10a-hexahydro-5H-[1]benzothiopyrano[2,3-c]pyridin - 5 - one [production see Example 2, section (b)], 15.5 g. of anhydrous sodium carbonate, 19 g. of isobutyl bromide and 100 cc. of dimethylformamide is stirred at 100° for 14 hours. After cooling the reaction mixture is poured into 400 cc. of wate rand is then shaken out several times with ether. The ether extracts are washed with water, dried over sodium sulphate and concentrated by evaporation at reduced pressure. The 2-isobutyl-1,2,3,4,4a,10a-hexahydro - 5H - [1]benzothiopyrano[2,3-c]pyridin-5-one, obtained as residue, is recrystallized from hexane. M.P. 79–81°.

(b) A solution of 3.9 g. of sodium borohydride in 12 cc. of water and 0.5 cc. of a concentrated solution of caustic soda is added dropwise at 30–40° to a solution of 13.3 g. of 2-isobutyl-1,2,3,4,4a,10a-hexahydro-5H-[1]benzothiopyrano[2,3-c]pyridin - 5 - one in 115 cc. of ethanol. The reaction mixture is subsequently stirred at 40° for 1 hour and at 70° for 2 hours, 20 cc. of methanol are added and the mixture is stirred at 70° for a further 30 minutes. The resulting suspension is evaporated to dryness at reduced pressure. The residue is divided between water and chloroform, the chloroform solution is separated and the aqueous phase is again shaken out with chloroform. The combined organic solutions are dried over sodium sulphate and concentrated by evaporation at reduced pressure. 2-isobutyl-1,2,3,4, 4a,10a - hexahydro - 5H - [1]benzothiopyrano[2,3-c]-pyridin-5-ol is obtained as oily residue (mixture of isomers), from which the isomer A crystallizes from isopropanol. M.P. 108–111°.

2-isobutyl - 1,2,3,4,4a,10a - hexahydro - 5H - [1]-benzothiopyrano[2,3-c]pyridin - 5 - ol may also be produced in the following manner:

(c) 50 g. of 1,2,3,4,4a,10a - hexahydro - 5H - [1]-benzothiopyrano[2,3-c]pyridin - 5 - one [production see Example 2, section (b)] are dissolved in 320 cc. of ethanol and a solution of 14.7 g. of sodium borohydride in 45 cc. of water and 1.5 cc. of a concentrated caustic soda solution is added dropwise at 35–40°. The reaction solution is stirred at 40° for 1 hour and at 70° for 2 hours, 35 cc. of methanol are added and the mixture is heated to the boil for 30 minutes. The reaction mixture is then evaporated to dryness at reduced pressure and the residue is divided between 1.5 liters of chloroform and 1.5 liters of water. After separating the organic solution the aqueous portion is again shaken out thrice with chloroform. The combined chloroform solutions are washed with water, dried over sodium sulphate and concentrated by evaporation at reduced pressure. 1,2,3,4, 4a,10a - hexahydro - 5H - [1]benzothiopyrano[2,3-c]-pyridin - 5 - ol. is obtained as a viscous residue (mixture of isomers). The isomer A has a M.P. of 165–167° (from isopropanol).

(d) 20 g. of 1,2,3,4,4a,10a - hexahydro - 5H - [1]-benzothiopyrano[2,3-c]pyridin - 5 - ol are dissolved in 350 cc. of chloroform while heating. 33.5 g. of anhydrous sodium carbonate are added to the cooled solution and a solution of 25.5 g. of isobutyl bromide in 20 cc. of chloroform is added dropwise at 20–25° while stirring. The reaction mixture is subsequently stirred at room temperature for 1 hour and at reflux temperature for 20 hours, 350 cc. of chloroform are added and the mixture is filtered whilst hot. The filter residue is washed out with chloroform. After washing with a saturated sodium chloride solution the combined chloroform solutions are dried over sodium sulphate and concentrated by evaporation at reduced pressure. 2 - isobutyl - 1,2,3,4,4a,10a-hexahydro - 5H - [1]benzothiopyrano[2,3-c]pyridin-5-ol is obtained as a viscous residue, from which the isomer A is crystallized from isopropanol. M.P. 108–111°.

EXAMPLE 16

7-hydroxy-2-methyl-1,3,4,10a-tetrahydro-2H-[1]benzothiopyrano[2,3-c]pyridine 33 cc. of a 26% solution of hydrogen chloride in isopropanol are added to a suspension of 5.0 g. of 5,7-dihydroxy - 2 - methyl - 1,2,3,4,4a,10a - hexahydro-5H-[1]benzothiopyrano[2,3-c]pyridine in 20 cc. of isopropanol and the mixture is heated to the boil while stirring for 5 hours. After cooling the hydrochloride of the title compound is filtered off and recrystallized from ethanol/isopropanol. M.P. 247–250° (decomp.)

The 5,7 - dihydroxy - 2 - methyl-1,2,3,4,4a,10a-hexahydro - 5H - [1]benzothiopyrano[2,3-c]pyridine, used as starting material, may be produced as follows:

(a) A solution of 13.5 g. of 7-methoxy - 2 - methyl-1,2,3,4,4a,10a - hexahydro - 5H - [1]benzothiopyrano-[2,3-c]pyridin - 5 - one [production see Example 7, section (b)] in 675 cc. of anhydrous methylene chloride is cooled to —80° and a solution of 27 g. of boron tribromide in 270 cc. of anhydrous methylene chloride is added dropwise at the same temperature during the course of 1 hour. The mixture is stirred at —80° for a further 30 minutes, the cooling is removed and the reaction mixture is allowed to reach room temperature while stirring. After standing at room temperature for 16 hours, 300 cc. of water are added dropwise to the mixture at 2–5°, the mixture is made slightly alkaline with aqueous ammonia, the organic phase is separated and the aqueous portion is again extracted thrice with methylene chloride. The combined methylene chloride solutions are washed with water and dried over magnesium sulphate, whereupon the solvent is evaporated at reduced pressure. The residue is dissolved in methanol and acidified with a solution of hydrogen chloride in ethanol. The 7 - hydroxy - 2 - methyl - 1,2,3,4,4a,10a-hexahydro - 5H - [1]benzothiopyrano[2,3-c]pyridin-5-one hydrochloride which crystallizes is filtered off and recrystallized from methanol. M.P. 260–261° (sintering over 257°).

(b) A solution of 3.2 g. of sodium borohydride in 10 cc. of water and 0.5 cc. of a concentrated solution of caustic soda is added dropwise at 25–40° to a suspension of 8.1 g. of 7-hydroxy-2-methyl-1,2,3,4,4a,10a-hexahydro-5H - [1]benzothiopyrano[2,3-c]pyridin-5-one hydrochloride in 60 cc. of ethanol. The reaction mixture is stirred at 40° for 1 hour and at 70° for 2 hours, 10 cc. of methanol are added, the mixture is heated to the boil for 30 minutes and evaporated to dryness at reduced pressure. The residue is triturated with 200 cc. of water, is filtered and washed with water until neutral. After recrystallizing from isopropanol the resulting 5,7-dihydroxy-2-methyl - 1,2,3,4,4a,10a-hexahydro-5H[1]benzothiopyrano [2,3-c]pyridine has a M.P. of 250–251°.

EXAMPLE 17

(—)-2-methyl-1,3,4,10a-tetrahydro-2H-[1]benzothiopyrano[2,3-c]pyridine 15.7 g. of (+)-dibenzoyl-L-tartaric acid are added to 19 g. of 2-methyl-1,3,4,10a-tetrahydro-2H-[1]benzothiopyrano[2,3-c]pyridine base (production see Example 1) in 20 cc. of ethanol and the mixture is allowed to crystallize. The salt which crystallizes is filtered off and boiled with 400 cc. of methylene chloride. The insoluble portion is filtered off, the filtrate is concentrated to half its volume and allowed to stand at room temperature for 24 hours. The solution is separated by filtration from a small amount of product which crystallizes and is evaporated to dryness at reduced pressure. The residue is dissolved in 40 cc. of acetone and is allowed to stand until it crystallizes. The (+)-dibenzoyl tartrate of the compound indicated in the heading, which crystallizes, is subsequently filtered off and recrystallized twice from methylene chloride/acetone. The resulting product is then dissolved in water, ether is added and the mixture is made alkaline with a concentrated solution of caustic soda. After separating the organic solution the aqueous portion is again extracted twice with ether, the extracts are washed with water, dried over sodium sulphate and the solvent is evaporated at reduced pressure. The resulting base is dissolved in ethanol and the pH of the solution is adjusted to 3 with a 4 N solution of hydrogen chloride in ethanol, whereupon the hydrochloride of the title compound which crystallizes is filtered off. M.P. 265–267° (sintering over 263°). $[\alpha]_D^{23} = -58.6°$.

EXAMPLE 18

(+)-2-methyl-1,3,4,10a-tetrahydro-2H-[1] benzothiopyrano[2,3-c]pyridine 19 g. of 2-methyl-1,3,4,10a-tetrahydro-2H-[1]benzothiopyrano[2,3-c]pyridine base (production see Example 1) are dissolved in 40 cc. of ethanol and 15.7 g. of (—)-dibenzoyl-D-tartaric acid are added and the mixture is allowed to stand until it crystallizes. After filtering off and recrystallizing 5 times from methanol/methylene chloride (9:1) the pure (—)-dibenzoyl tartrate is obtained. The base is liberated from this salt and the hydrochloride of the title compound is produced in a manner analogous to that indicated in Example 7. M.P. 267–268° (sintering over 263°). $[\alpha]_D^{23} = +58.6°$.

EXAMPLE 19

2-cyclopropylmethyl-1,3,4,10a-tetrahydro-2H-[1]benzothiopyrano[2,3-c]pyridine

The hydrochloride of the title compound is obtained in a manner analogous to that described in Example 11 from 12 g. of 2-cyclopropylmethyl-1,2,3,4,4a,10a-hexahydro-5H-[1]benzothiopyrano[2,3-c]pyridin-5-ol (mixture of isomers), 30 cc. of concentrated hydrochloric acid and 30 cc. of water. After recrystallizing thrice from ethanol the compound has a M.P. of 258–260°.

The 2-cyclopropylmethyl-1,2,3,4,4a,10a-hexahydro-5H-[1]benzothiopyrano[2,3-c]pyridin-5-ol, used as starting material, is produced as follows:

(a) 2 - cyclopropyl-carbonyl-1,2,3,4,4a,10a-hexahydro-5H-[1]benzothiopyrano[2,3-c]pyridin-5-one, having a M.P. of 163–165° (ethanol), is obtained in accordance with the process described in Example 11, section (a), from 19.2 g. of 1,2,3,4,4a,10a-hexahydro-5H-[1]benzothiopyrano[2,3-c]pyridin-5-one, 9.4 g. of triethylamine, 10.2 g. of cyclopropyl-carboxylic acid chloride in 370 cc. of absolute benzene.

(b) 15 g. of 2-cyclopropyl-carbonyl-1,2,3,4,4a,10a-hexahydro-5H-[1]benzothiopyranol[2,3-c]pyridin-5-one are reduced with 9 g. of lithium aluminum hydride in 470 cc. of absolute tetrahydrofuran in accordance with the process described in Example 11, section (b), to give 2-cyclopropylmethyl - 1,2,3,4,4a,10a - hexahydro - 5H-[1]benzothiopyrano[2,3-c]pyridin-5-ol (mixture of isomers); the isomer A has a M.P. of 122–124° (isopropanol).

EXAMPLE 20

2-cyclohexylmethyl-1,3,4,10a-tetrahydro-2H-[1]benzothiopyrano[2,3-c]pyridine 17 g. of 2-cyclohexylmethyl-1,2,3,4,4a,10a-hexahydro-5H-[1]benzothiopyrano[2,3-c]pyridin-5-ol (mixture of isomers) are heated to the boil for 15 minutes in 35 cc. of concentrated hydrochloric acid and 35 cc. of water. The solution is concentrated by evaporation at reduced pressure, the residue is taken up in 200 cc. of water and the resulting solution is made alkaline with a concentrated solution of caustic soda. The precipitated base is extracted with methylene chloride, the extract is washed with water, dried over magnesium sulphate and the solvent is removed at reduced pressure.

The oily residue is then dissolved in 80 cc. of ethanol, the pH of the solution is adjusted to 3 with a 4 N solution of hydrogen chloride in ethanol and the resulting hydrochloride of the title compound is filtered off and recrystallized from ethanol. M.P. 231–232°.

The 2 - cyclohexylmethyl-1,2,3,4,4a,10a-hexahydro-5H-[1]benzothiopyrano[2,3-c]pyridin-5-ol, used as starting material, is produced as follows:

(a) 7.4 g. of triethylamine and subsequently a solution of 11.2 g. of cyclohexane-carboxylic acid chloride in 40 cc. of absolute benzene are added dropwise at 20–25° to a solution of 15 g. of 1,2,3,4,4a,10a-hexahydro-5H-[1] benzothiopyrano[2,3-c]pyridin-5-one [production see Example 2, section (b)] in 260 cc. of absolute benzene. The reaction solution is stirred at room temperature for 1 hour, at 50° for 2 hours and is again cooled to 20°. The turbid reaction mixture is washed thrice with water, is dried over magnesium sulphate and the solvent is removed at reduced pressure. The 2-cyclohexyl-carbonyl-1,2,3,4,4a,10a-hexahydro - 5H - [1]benzothiopyrano[2,3 - c]pyridin-5-one obtained as residue is recrystallized from benzene/petroleum ether. M.P. 169–170°.

(b) A solution of 19 g. of cyclohexyl-carbonyl-1,2,3,4,4a,10a-hexahydro-5H-[1]benzothiopyrano[2,3 - c]pyridin-5-one in 100 c. of absolute tetrahydrofuran is reduced with a suspension of 10 g. of lithium aluminium hydride in 400 cc. of tetrahydrofuran in accordance with the process described in Example 9, section (b). 2-cyclohexylmethyl-1,2,3,4,4a,10a-hexahydro - 5H - [1]benzothiopyrano[2,3-c]pyridin-5-ol (mixture of isomers) is obtained as a solid precipitate and after triturating with petroleum ether has a M.P. of 157–159°.

EXAMPLE 21

7-chloro-2-cyclohexylmethyl-1,3,4,10a-tetrahydro-2H-[1]benzothiopyrano[2,3-c]pyridine The base of the title compound is produced in accordance with the process described in Example 20 from 17 g. of 7-chloro-2-cyclohexylmethyl-1,2,3,4,4a,10a-hexahydro - 5H-[1]benzothiopyrano[2,3-c]pyridin-5-ol (mixture of isomers) by heating in 40 cc. of concentrated hydrochloric acid and 40 cc. of water for 15 minutes. The base is recrystallized from ethanol. M.P. 176–178°.

The 7-chloro - 2 - cyclohexylmethyl-1,2,3,4,4a,10a-hexahydro-5H-[1]benzothiopyrano[2,3-c]pyridin-5-ol, used as starting material, may be produced as follows:

(a) A solution of 420 g. of chloroformic acid ethyl ester in 375 cc. of absolute benzene is added dropwise at 20–30° during the course of 1 hour to a solution of 300 g. of 7-chloro-2-methyl-1,2,3,4,4a,10a-hexahydro-5H-[1] benzothiopyrano[2,3-c]pyridin-5-one [production see Example 4, section (b)] in 3 liters of benzene. The resulting turbid solution is heated to the boil for 6½ hours, is then cooled to 20°, is washed first with dilute hydrochloric acid and then with water, is dried over magnesium sulphate and concentrated by evaporation at reduced pressure. The 2-ethoxycarbonyl - 7 - chloro - 1,2,3,4,4a,10a - hexahydro-5H-[1]benzothiopyrano[2,3-c]pyridin-5-one, obtained as crystalline residue, is recrystallized from benzene/hexane. M.P. 95–96°.

(b) 160 g. of 2-ethoxycarbonyl-7-chloro-1,2,3,4,4a,10a-hexahydro-5H-[1]benzothiopyrano[2,3 - c]pyridin-5-one are heated to the boil with 4.4 liters of 5 N hydrochloric acid for 6 days in an atmosphere of nitrogen. The 7-chloro - 1,2,3,4,4a,10a - hexahydro-5H-[1]benzothiopyrano[2,3-c]pyridin-5-one hydrochloride obtained as a powdery product is filtered off after cooling and recrystallized from methanol/water. M.P. over 300° (decomp.).

(c) 7-chloro - 2 - cyclohexyl - carbonyl-1,2,3,4,4a,10a-hexahydro-5H-[1]benzothiopyrano[2,3-c]pyridin - 5 -one, having a M.P. of 176–177° (benzene/petroleum ether), is obtained in accordance with the process described in Example 20, section (a), from 15 g. of 7-chloro-1,2,3,4,4a,10a-hexahydro - 5H - [1]benzothiopyrano[2,3-c]pyridin-5-one and 6.4 g. of triethylamine in 200 cc. of absolute benzene and 9.7 g. of cyclohexane-carboxylic acid chloride in 60 cc. of absolute benzene.

(d) Reduction of 17 g. of 7-chloro-2-cyclohexylcarbonyl-1,2,3,4,4a,10a-hexahydro - 5H-[1]benzothiopyrano-[2,3-c]pyridin-5-one in 90 cc. of absolute tetrahydrofuran with 8.1 g. of lithium aluminium hydride in 330 cc. of absolute tetrahydrofuran in accordance with the process described in Example 20, section (b), yields 7-chloro-2-cyclohexylmethyl - 1,2,3,4,4a,10a - hexahydro - 5H - [1] benzothiopyrano[2,3-c]pyridin-5-ol as a mixture of isomers having a M.P. of 154–157°, from which the pure isomer A crystallizes from acetone. M.P. 169–170°.

EXAMPLE 22

9-bromo-2-methyl-1,3,4,10a-tetrahydro-2H-[1] benzothiopyrano[2,3-c]pyridine

A solution of 14 g. of 9-bromo-2-methyl-1,2,3,4,4a, 10a-hexahydro-5H-[1]benzothiopyrano[2,3 - c]pyridin-5-ol (isomer A, isomer B or mixture of isomers) in 28 cc. of concentrated hydrochloric acid and 28 cc. of water is heated to the boil for 10 minutes and is concentrated to half its volume at reduced pressure. After cooling, the precipitated hydrochloride of the title compound is filtered off and recrystallized from ethanol; M.P. 260–262°. (The base has a M.P. of 125–126°, from acetone.)

The 9-bromo - 2 - methyl-1,2,3,4,4a,10a-hexahydro-5H-[1]benzothiopyrano[2,3-c]pyridin-5-ol, used as starting material, is produced as follows:

(a) A solution of 250 g. of 1-methyl-1,2,5,6-tetrahydro-isonicotinic acid ethyl ester, 356 g. of o-bromothiophenol and 30 cc. of piperidine in 1.5 liters of ethanol is heated to the boil for 10 hours in an atmosphere of nitrogen. After the addition of a further 10 cc. of piperidine the reaction mixture is stirred at the boil for 10 hours, is subsequently concentrated by evaporation at reduced pressure and the residue is heated to 120–140° at 12 mm. of Hg for 1 hour, in order to remove the o,o'-dibromodiphenyldisulphide formed as by-product. The residue remaining in the flask is then distilled in a high vacuum, whereby 1-methyl-3-(2-bromophenyl)-thio-isonipecotinic acid ethyl ester distils over at about 185–195°/0.1 mm. of Hg as an oil (mixture of isomers).

(b) A solution of 157 g. of 1-methyl-3-(2-bromophenyl)-thio-isonipecotinic acid ethyl ester in 150 cc. of a xylene mixture is added dropwise at 90–100° during the course of 1 hour to a mixture of 1500 g. of polyphosphoric acid and 300 cc. of a xylene mixture in an atmosphere of nitrogen, the mixture is heated to 130° while stirring for a further hour, the dark brown suspension is cooled to about 90° and is poured into 5 liters of water. After the addition of 1 kg. of ice and 2 liters of benzene the mixture is made alkaline with 2.5 liters of a concentrated caustic soda solution while stirring, the organic layer is separated and the aqueous portion is again shaken out twice with benzene. The combined organic extracts are washed with water, dried over magnesium sulphate, filtered through acid charcoal and the solvent is evaporated at reduced pressure. After drying at 120°/12 mm. of Hg the residue is crystallized from acetone or is purified from methanol as hydrochloride. The 9-bromo-2-methyl-1,2,3,4,4a,10a - hexahydro - 5H - [1]benzothiopyrano[2,3-c]pyridin-5-one base has a M.P. of 117–118°. The hydrochloride has a M.P. of 302–304° (decomp.).

(c) A solution of 3.9 g. of sodium borohydride in 16 cc. of water and 0.4 cc. of a concentrated solution of caustic soda is added dropwise at 30–40° to a solution of 15 g. of 9-bromo-2-methyl-1,2,3,4,4a,10a-hexahydro-5H-[1]benzothiopyrano[2,3-c]pyridin-5-one (base) in 300 cc. of ethanol, the reaction solution is stirred at 40° for 1 hour and subsequently at 70° for 2 hours, 20 cc. of methanol are then added and the mixture is stirred at 70° for a further 30 minutes. The reaction mixture is evaporated to dryness at reduced pressure, the residue is shaken out between 500 cc. of chloroform and 500 cc. of water, the aqueous solution is separated and is again shaken out with chloroform. The combined chloroform solutions are washed with water, dried over sodium sulphate and concentrated by evaporation, whereby 9-bromo-2 - methyl - 1,2,3,4,4a,10a - hexahydro-5H-[1]benzothiopyrano[2,3-c]pyridin-5-ol is obtained as a crystalline residue (mixture of isomers). M.P. 176–180°. The isomer A is obtained from this mixture by crystallizing from methanol, M.P. 185–186°.

EXAMPLE 23

7-chloro-1,3,4,10a-tetrahydro-2H-[1]benzothiopyrano[2,3-c]pyridine

The hydrochloride of the title compound, having a M.P. of about 310° (decomp.) (from water), is obtained in accordance with the process described in Example 22 from 12 g. of 7-chloro-1,2,3,4,4a,10a-hexahydro-5H-[1]-benzothiopyrano[2,3-c]pyridin-5-ol (mixture of isomers) by heating in 24 cc. of concentrated hydrochloric acid and 24 cc. of water. The malate has a M.P. of 189–190°.

The 7 - chloro-1,2,3,4,4a,10a-hexahydro-5H-[1]benzo-thiopyrano[2,3-c]pyridin-5-ol, used as starting material, may be produced as follows:

(a) A solution of 420 g. of chloroformic acid ethyl ester in 375 cc. of absolute benzene is added dropwise at 20–30° during the course of 1 hour to a solution of 300 g. of 7-chloro-2-methyl-1,2,3,4,4a,10a-hexahydro-5H-[1]benzothiopyrano[2,3-c]pyridin-5-one [production see Example 4, section (b)] in 3 liters of benzene. The resulting turbid solution is heated to the boil for 6½ hours, is then cooled to 20°, is washed first with dilute hydrochloric acid and then with water, is dried over magnesium sulphate and concentrated by evaporation at reduced pressure. The 2-ethoxycarbonyl-7-chloro-1,2,3,4,4a,10a-hexahydro - 5H-[1]benzothiopyrano[2,3-c]pyridin-5-one, obtained as crystalline residue, is recrystallized from benzene/hexane. M.P. 95–96°.

(b) 160 g. of 2-ethoxycarbonyl-7-chloro-1,2,3,4,4a,10a-hexahydro-5H[1]benzothiopyrano[2,3-c]pyridin - 5 - one are heated to the boil with 4.4 liters of 5 N hydrochloric acid for 6 days in an atmosphere of nitrogen. The 7-chloro - 1,2,3,4,4a,10a-hexahydro-5H-[1]benzothiopyrano [2,3-c]pyridin-5-one hydrochloride, obtained as powdery product, is filtered off after cooling and is recrystallized from methanol/water. M.P. over 300° (decomp.).

(c) 7 - chloro-1,2,3,4,4a,10a-hexahydro-5H-[1]benzo-thiopyrano[2,3-c]pyridin-5-ol (mixture of isomers), having a M.P. of 178–183°, is obtained in accordance with the process described in Example 22, section (c), from 110 g. of 7-chloro-1,2,3,4,4a,10a-hexahydro-5H-[1]benzo-thiopyrano[2,3-c]pyridin-5-one in 1 liter of ethanol and 39.2 g. of sodium borohydride in 160 cc. of water and 4 cc. of a concentrated solution of caustic soda.

EXAMPLE 24

7-chloro-2-n-propyl-1,3,4,10a-tetrahydro-2H-[1]benzothiopyrano[2,3-c]pyridine 18 g. of 7-chloro-2-n-propyl-1,2,3,4,4a,10a-hexahydro-5H-[1]benzothiopyrano[2,3-c]pyridin-5-ol (mixture of isomers) are suspended in 40 cc. of water and 40 cc. of concentrated hydrochloric acid are added. The material dissolves while the temperature rises to about 60°. The reaction solution is stirred at 100° for a further 20 minutes, is concentrated by evaporation at reduced pressure and the thick residue is crystallized from ethanol. The pure hydrochloride of the title compound has a M.P. of 208–211° (decomp.) after recrystallization from ethanol/ether.

The 7 - chloro - 2-n-propyl-1,2,3,4,4a,10a-hexahydro-5H-[1]benzothiopyrano[2,3-c]pyridin-5-ol, used as starting material, may be produced as follows:

(a) 29 g. of 7-chloro-1,2,3,4,4a,10a-hexahydro-5H-[1]-benzothiopyrano[2,3-c]pyridin-5-one [production see Example 23, section (c)] are dissolved in 450 cc. of absolute benzene at 50°. After cooling to 20° 12.6 g. of triethylamine and then a solution of 11.5 g. of propionyl chloride in 60 cc. of absolute benzene is added dropwise to this solution. After the addition of a further 3 cc. of triethylamine the reaction mixture is stirred at room temperature for 1 hour and at 50° for 2 hours, is cooled to 20° and 100 cc. of water are added. The benzene solution is separated and the aqueous portion is again extracted thrice with methylene chloride. The combined organic extracts are washed with water, dried over magnesium sulphate and the solvent is distilled off at reduced pressure. The resulting crude 7-chloro-2-propionyl-1,2,3,4,4a,10a - hexahydro-5H-[1]benzothiopyrano[2,3-c]pyridin-5-one is recrystallized from ethanol. M.P. 131–132°.

(b) A solution of 36 g. of 7-chloro-2-propionyl-1,2,3,4,4a,10a - hexahydro - 5H - [1]benzothiopyrano[2,3-c]pyridin-5-one in 400 cc. of absolute tetrahydrofuran is added dropwise during the course of 2 hours to a suspension of 19.4 g. of lithium aluminum hydride in 800 cc. of absolute tetrahydrofuran. The reaction mixture is then heated to the boil for 12 hours, is cooled to 0° and 105 cc. of a saturated sodium sulphate solution are added dropwise at 0–5°. Stirring is continued at room temperature for 30 minutes, the precipitate is filtered off and boiled out thrice with tetrahydrofuran. The combined tetrahydrofuran solutions are dried over magnesium sulphate, the solvent is evaporated at reduced pressure and the solid residue is crystallized from isopropanol. 7-chloro-2 - n - propyl-1,2,3,4,4a,10a-hexahydro-5H-[1]benzothiopyrano[2,3-c]pyridin-5-ol (isomer A), having a M.P. of 163–164°, is obtained. After concentrating the mother liquors and adding hexane to the residue a further portion of this compound is obtained as a mixture of isomers having a M.P. of 140–148°.

EXAMPLE 25

9-chloro-2-methyl-1,3,4,10a-tetrahydro-2H-[1]benzothiopyrano[2,3-c]pyridine

The hydrochloride of the title compound, having a M.P. of 258–259° (ethanol), is obtained in accordance with the process described in Example 22 from 13 g. of 9 - chloro - 2 - methyl-1,2,3,4,4a,10a-hexahydro-5H-[1]-benzothiopyrano[2,3-c]pyridin-5-ol (mixture of isomers) by heating in 30 cc. of concentrated hydrochloric acid and 30 cc. of water for 5 minutes and subsequently cooling the reaction mixture.

The 9 - chloro - 2-methyl-1,2,3,4,4a,10a-hexahydro-5H-[1]benzothiopyrano[2,3-c]pyridin-5-ol, used as starting material, is produced as follows:

(a) 1 - methyl - 3-(2-chlorophenylthio)-isonipecotinic acid ethyl ester is obtained in accordance with the process described in Example 22, section (a), from 255 g. of 1-methyl-1,2,35,6-tetrahydroisonicotinic acid ethyl ester, 260 g. of o-chlorothiophenol and 20 cc. of piperidine in 1.5 liters of ethanol with the addition of 0.5 g. of hydroquinone. B.P. 165–173°/0.3 mm. of Hg (mixture of isomers).

(b) 9 - chloro - 2 - methyl - 1,2,3,4,4a,10a-hexahydro-5H - [1]benzothiopyrano[2,3-c]pyridin-5-one is produced in accordance with the process described in Example 22, section (b), from 130 g. of 1-methyl-3-(2-chlorophenyl-thio)-isonipecotinic acid ethyl ester (mixture of isomers), 1.3 kg. of polyphosphoric acid and 390 cc. of a xylene mixture by heating to 130° for 1½ hours. The resulting product is obtained as a mixture of isomers, from which one of the components is obtained in pure form, having a M.P. of 124–125°, by crystallization from methanol. The pH of the methanolic solution is then adjusted to 3 with a solution of hydrogen chloride in isopropanol, the precipitated product is filtered off and recrystallized from ethanol. A further amount of 9 - chloro - 2 - methyl-1,2,3,4,4a,10a - hexahydro-5H-[1]benzothiopyrano[2,3-c]pyridin-5-one hydrochloride (mixture of isomers), having a M.P. of 297–300° (decomp.), is thus obtained.

(c) 9 - chloro - 2 - methyl - 1,2,3,4,4a,10a - hexahydro-5H-[1]benzothiopyrano[2,3-c]pyridin-5-ol is obtained as a mixture of isomers, having a M.P. of 164–166°, in accordance with the process described in Example 22, section (c), from 15 g. of 9 - chloro - 2-methyl-1,2,3,4,4a,10a-hexahydro - 5H - [1]benzothiopyrano[2,3-c]pyridin-5-one (pure form) in 300 cc. of ethanol and 4.5 g. of sodium borohydride in 16 cc. of water and 0.4 cc. of a concentrated solution of caustic soda. The isomer A may be obtained in pure form by crystallization from acetone. M.P. 170–171°.

EXAMPLE 26

9-chloro-1,3,4,10a-tetrahydro-2H-[1]benzothiopyrano[2,3-c]pyridine

The hydrochloride of the title compound, having a M.P. over 300° (decomp.), is obtained in accordance with the process described in Example 22 from 14 g. of 9-chloro-1,2,3,4,4a,10a - hexahydro-5H-[1]benzothiopyrano[2,3-c]pyridin-5-ol (mixture of isomers) by heating in 35 cc. of concentrated hydrochloric acid and 35 cc. of water for 10 minutes and subsequently cooling the reaction mixture. A suspension of 13 g. of this hydrochloride in 100 cc. of water and 100 cc. of chloroform is made alkaline with a concentrated solution of caustic soda, the chloroform solution is separated and the aqueous portion is again shaken out with chloroform. The combined organic solutions are washed with water, dried over sodium sulphate, concentrated by evaporation at reduced pressure and the residue is recrystallized from acetone/hexane. The title compound (base) has a M.P. of 93–95°.

The 9-chloro-1,2,3,4,4a,10a - hexahydro - 5H - [1]benzothiopyrano[2,3-c]pyridin-5-ol, used as starting material, is produced as follows:

(a) 2 - ethoxycarbonyl - 9 - chloro - 1,2,3,4,4a,10a-hexahydro - 5H - [1]benzothiopyrano[2,3-c]pyridin-5-one, having a M.P. of 99–101° (ethanol), is obtained in accordance with the process described in Example 23, section (a), from 50 g. of 9 - chloro - 2 - methyl - 1,2,3,4,4a,10a - hexahydro - 5H - [1]benzothiopyrano[2,3-c]pyridin-5-one in 450 cc. of absolute benzene an 71 g. of chloroformic acid ethyl ester in 100 cc. of absolute benzene by heating for 4 hours.

(b) 55 g. of 2 - ethoxycarbonyl - 9 - chloro - 1,2,3,4,4a,10a - hexahydro - 5H - [1]benzothiopyrano[2,3-c]pyridin-5-one are heated at reflux for 6 days with 1.9 liters of 5 N hydrochloric acid in accordance with the process described in Example 23, section (b). The resulting 9 - chloro-1,2,3,4,4a,10a - hexahydro - 5H - [1]benzothiopyrano[2,3-c]pyridin-5-one hydrochloride has a M.P over 310° (decomp.) (methanol/water).

(c) 9 - chloro - 1,2,3,4,4a,10a - hexahydro-5H-[1]benzothiopyrano[2,3-c]pyridin-5-ol is obtained in the form of an oily mixture of isomers in accordance with the process described in Example 22, section (c), from 14 g. of 9 - chloro - 1,2,3,4,4a,10a - hexahydro-5H-[1]benzothiopyrano[2,3-c]pyridin-5-one in 300 cc. of ethanol and 4.5 g. of sodium borohydride in 16 cc. of water and 0.4 cc. of a concentrated caustic soda solution; the pure isomer A is obtained from this mixture of isomers by crystallization from ethanol. M.P. 198–199°.

EXAMPLE 27

7-fluoro-2-methyl-1,3,4,10a-tetrahydro-2H-[1]benzothiopyrano[2,3-c]pyridine

The hydrochloride of the title compound, having a M.P. of 277–278° (methanol/ethanol), is obtained in accordance with the process described in Example 22 from 16 g. of 7-fluoro-2-methyl-1,2,3,4,4a,10a-hexahydro-5H-[1]benzothiopyrano[2,3-c]pyridin - 5 - ol (mixture of isomers) by heating in 40 cc. of concentrated hydrochloric acid and 40 cc. of water for 30 minutes and subsequent cooling of the reaction mixture.

The 7 - fluoro - 2 - methyl - 1,2,3,4,4a,10a-hexahydro-5H - [1]benzothiopyrano[2,3-c]pyridin-5 - ol, used as starting material, is produced as follows:

(a) 1 - methyl - 3 - (4 - fluorophenylthio)-isonipecotinic acid ethyl ester is obtained in accordance with the process described in Example 22, section a), from 240 g. of 1-methyl - 1,2,5,6-tetrahydroisonicotinic acid ethyl ester, 200 g. of 4 - fluorothiophenol and 20 cc. of piperidine in 1.5 liters of ethanol with the addition of 0.5 g. of hydroquinone; B.P. 132–136°/0.05 mm. of Hg (mixture of isomers). The isomer A has a M.P. of 72–73° (hexane).

(b) 7 - fluoro-2-methyl-1,2,3,4,4a,10a-hexahydro-5H-[1]bnzothiopyrano[2,3-c]pyridin-5-one is obtained in accordance with the process described in Example 22, section (b), from 100 g. of 1-methyl-3-(4-fluorophenylthio)-isonipecotinic acid ethyl ester (mixture of isomers) and 1 kg. of polyphosphoric acid and 400 cc. of a xylene mixture by heating to 130° for 1½ hours. M.P. 122–123° (methanol).

(c) 7 - fluoro - 2 - methyl - 1,2,3,4,4a,10a-hexahydro-5H - [1]benzothiopyrano[2,3-c]pyridin-5-ol is obtained as a mixture of isomers, having a M.P. of 140–152°, in accordance with the process described in Example 22, section (c), from 15 g. of 7-fluoro-2-methyl-1,2,3,4,4a,10a-hexahydro - 5H - [1]benzothiopyrano[2,3-c]pyridin-5-one in 300 cc. of ethanol and 4.0 g. of sodium borohydride in 16 cc. of water and 0.4 cc. of a concentrated solution of caustic soda; the pure isomer A is obtained from this mixture by crystallization from ethanol. M.P. 161–162°.

EXAMPLE 28

7-flloro-1,3,4,10a-tetrahydro-2H-[1]
benzothiopyrano[2,3-c]pyridine

The hydrochloride of the title compound, having a M.P. of 256–258° (methanol/ethanol), is obtained in accordance with the process described in Example 22 from 14 g. of 7-fluoro-1,2,3,4,4a,10a-hexahydro-5H-[1]benzothiopyrano[2,3-c]pyridin-5-ol (mixture of isomers) by heating in 40 cc. of concentrated hydrochloric acid and 40 cc. of water during 30 minutes and subsequently cooling the reaction mixture.

The 7 - fluoro - 1,2,3,4,4a,10a - hexahydro-5H-[1] benzothiopyran[2,3-c]pyridin-5-ol, used as starting material, is produced as follows:

(a) 2-ethoxycarbonyl - 7 - fluoro-1,2,3,4,4a,10a-hexahydro-5H-[1]benzothiopyrano[2,3-c]pyridin - 5-one, having a M.P. of 104–105° (ethanol), is obtained in accordance with the process described in Example 23, section (a), from 50 g. of 7-fluoro-2-methyl-1,2,3,4,4a,10a-hexahydro-5H-[1]benzothiopyrano[2,3-c]pyridin-5-one in 450 cc. of absolute benzene and 70.5 g. of chloroformic acid ethyl ester in 100 cc. of absolute benzene by boiling for 3 hours.

(b) 55 g. of 2-ethoxycarbonyl-7-fluoro-1,2,3,4,4a,10a-hexahydro-5H-[1]benzothiopyrano[2,3-c]pyridin - 5 - one are boiled at reflux for 4 days with 1 liter of concentrated hydrochloric acid and 1 liter of water, in accordance with the process described in Example 23, section (b). The resulting 7 - fluoro-1,2,3,4,4a,10a-hexahydro-5H-[1]benzothiopyrano[2,3-c]pyridin-5-one hydrochloride has a M.P. of 332–335° (ethanol) (decomp.).

(c) 7 - fluoro-1,2,3,4,4a,10a-hexahydro-5H-[1]benzothiopyrano[2,3-c]pyridin-5-ol is obtained as an oily mixture of isomers in accordance with the process described in Example 22, section (c), from 19 g. of 7 - fluoro-1,2,3,4,4a,10a - hexahydro - 5H-[1]benzothiopyrano[2,3-c]pyridin-5-one in 300 cc. of ethanol and 4.5 g. of sodium borohydride in 16 cc. of water and 0.4 cc. of a concentrated caustic soda solution; the pure isomer A is obtained from this mixture by crystallization from ethanol/ether; M.P. 159–160°.

EXAMPLE 29

6,9-dichloro-2-methyl-1,3,4,10a-tetrahydro-
2H-[1]benzothiopyrano[2,3-c]pyridine The hydrochloride of the title compound, having a M.P. of 279–281° (ethanol), is obtained in accordance with the process described in Example 22 from 15 g. of 6,9-dichloro - 2 - methyl - 1,2,3,4,4a,10a-hexahydro-5H-[1]-benzothiopyrano[2,3-c]pyridin-5-ol mixture of isomers) by heating for 1 hour in 40 cc. of concentrated hydrochloric acid and 40 cc. of water and subsequently cooling the reaction mixture.

The 6,9 - dichloro-2-methyl-1,2,3,4,4a,10a-hexahydro-5H-[1]benzothiopyrano[2,3-c]pyridin-5-ol, used as starting material, is produced as follows:

(a) A solution of 90 g. of 1-methyl-1,2,5,6-tetrahydro-isonicotinic acid ethyl ester and 112 g. of 2,5-dichloro-thiophenol in 450 cc. of ethanol is heated to the boil in an atmoshpere of nitrogen for 24 hours. The solvent is subsequently removed at 12 mm. of Hg, and the residue is fractionated in a high vacuum, whereby 1-methyl-3-(2,5-dichlorophenylthio)-isonipecotinic acid ethyl ester distills over as on oily mixture of isomers at 175–183°/0.1–0.2 mm. of Hg.

(b) 6,9 - dichloro-2-methyl-1,2,3,4,4a,10a-hexahydro-5H[1]benzothiopyrano[2,3-c]pyridin-5-one is produced in accordance with the process described in Example 22, section (b), from 90 g. of 1-methyl-3-(2,5-dichlorophenyl-thio)-isonipecotinic acid ethyl ester, 800 g. of polyphosphoric acid and 160 cc. of a xylene mixture by stirring at 110–120° for 3 hours. M.P. 133–134° (from acetonitrile).

(c) 6,9-dichloro-2-methyl-1,2,3,4,4a,10a-hexahydro-5H-[1]benzothiopyrano[2,3-c]pyridin-5 - ol is obtained as a mixture of isomers, having a M.P. of 175–187°, in accordance with the process described in Example 22, section (c), from 15 g. of 6,9-dichloro-2-methyl-1,2,3,4,4a,-10a-hexahydro-5H-[1]benzothiopyrano[2,3-c]pyridin - 5-one in 270 cc. of ethanol, 4.0 g. of sodium borohydride in 14 cc. of water and 0.4 cc. of a concentrated caustic soda solution; the pure isomer A is obtained from this mixture by crystallization from methanol; M.P. 194–195°.

EXAMPLE 30

7,9-dichloro-2-methyl-1,3,4,10a-tetrahydro-2H-[1]-
benzothiopyrano[2,3-c]pyridine The hydrochloride of the title compound, having a M.P. of 271–273° (from ethanol), is obtained in accordance with the process described in Example 22 from 14 g. of 7,9-dichloro - 2-methyl-1,2,3,4,4a,10a-hexahydro-5H-[1]-benzothiopyrano[2,3-c]pyridin-5-ol (mixture of isomers) by boiling for 1 hour in 40 cc. of concentrated hydrochloric acid and 40 cc. of water and subsequently cooling the reaction mixture.

The 7,9-dichloro-2-methyl - 1,2,3,4,4a,10a - hexahydro-5H-[1]benzothiopyrano[2,3-c]pyridin-5-ol, used as starting material, is produced as follows:

(a) 1-methyl-3-(2,4-dichlorophenylthio)-isonipecotinic acid ethyl ester, having a B.P. of about 150–175°/0.3 mm. of Hg, is obtained as a mixture of isomers in accordance with the process described in Example 29, section (a), from 60 g. of 1-methyl-1,2,5,6-tetrahydro-iso-nicotinic acid ethyl ester and 77 g. of 2,4-dichloro-thiophenol in 310 cc. of ethanol.

(b) 7,9 - dichloro-2-methyl-1,2,3,4,4a,10a-hexahydro-5H-[1]benzothiopyrano[2,3-c]pyridin-5-one is produced in accordance with the process described in Example 22, section (b), from 35 g. of 1 - methyl - 3-(2,4-dichloro-phenylthio)-isonipecotinic acid ethyl ester, 300 g. of polyphosphoric acid and 150 cc. of a xylene mixture by stirring at 120–125° for 3 hours. The hydrochloride has a M.P. of 275–277° (methanol/ethanol).

(c) 7,9 - dichloro-2-methyl-1,2,3,4,4a,10a-hexahydro-5H-[1]benzothiopyrano[2,3-c]pyridin-5-ol is obtained as a mixture of isomers, having a M.P. of 170–178°, in accordance with the process described in Example 22, section (c), from 15 g. of 7,9-dichloro-2-methyl-1,2,3,4,4a,-10a-hexahydro - 5H-[1]benzothiopyrano[2,3-c]pyridin-5-one in 270 cc. of ethanol, 4.0 g. of sodium borohydride in 14 cc. of water and 0.4 cc. of concentrated caustic soda solution; the pure isomer A is obtained from this mixture by crystallization from ethanol; M.P. 182–183°.

EXAMPLE 31

7-methyl-1,3,4,10a-tetrahydro-2H-[1]-
benzothiopyrano[2,3-c]pyridine

The hydrochloride of the title compound, having a M.P. of 214–215° (ethanol), is produced in accordance with the process described in Example 22 from 13 g. of 7-methyl - 1,2,3,4,4a,10a - hexahydro - 5H-[1]benzothio[2,3-c]pyridin-5-ol (mixture of isomers) by heating in 28 cc. of concentrated hydrochloric acid and 28 cc. of water during 5 minutes.

The 7 - methyl - 1,2,3,4,4a,10a - hexahydro-5H-[1]-benzothiopyrano[2,3-c]pyridin-5-ol, used as starting material, is produced as follows:

(a) 2 - ethoxycarbonyl-7-methyl-1,2,3,4,4a,10a-hexahydro-5H-[1]benzothiopyrano[2,3-c]pyridin-5-one, having a M.P. of 79–81° (from ethanol), is obtained in accordance with the process described in Example 23, section (a), from 50 g. of 2,7-dimethyl-1,2,3,4,4a,10a-hexahydro-5H-[1]benzothiopyrano[2,3-c]pyridin-5-one [production see Example 3, section (b)] in 450 cc. of benzene and 76 g. of chloroformic acid ethyl ester in 100 cc. of absolute benzene by boiling for three hours.

(b) 55 g. of 2-ethoxycarbonyl-7-methyl-1,2,3,4,4a,10a-hexahydro - 5H - [1]benzothiopyrano[2,3-c]pyridin-5-one are heated to the boil for 4 days with 2.0 liters of 5 N hydrochloric acid in accordance with the process described in Example 23, section (c). 7-methyl-1,2,3,4,4a,10a-hexahydro - 5H - [1]benzothiopyrano[2,3-c]pyridin-5 one hydrochloride, having a M.P. over 320° (decomp.) (methanol/water), is obtained.

(c) 7 - methyl - 1,2,3,4,4a,10a - hexahydro - 5H - [1] benzothiopyrano[2,3-c]pyridin-5-ol is obtained as a viscous mixture of isomers in accordance with the process described in Example 22, section (c), from 13 g. of 7-methyl - 1,2,3,4,4a,10a - hexahydro - 5H - [1]benzothiopyrano[2,3-c]pyridin-5-one in 280 cc. of ethanol and 3.7 g. of sodium borohydride in 15 cc. of water and 0.3 cc. of concentrated caustic soda solution; this mixture of isomers is used for the splitting off of water without further purification.

EXAMPLE 32

7-methyl-2-n-propyl-1,3,4,10a-tetrahydro-2H-[1]benzothiopyrano[2,3-c]pyridine

The hydrochloride of the title compound, having a M.P. of 192–194° (sintering over 185°), is obtained in accordance with the process described in Example 22 from 22.4 g. of 7-methyl-2-n-propyl-1,2,3,4,4a,10a-hexahydro-5H-[1]benzothiopyrano[2,3-c]pyridin - 5 - ol (mixture of isomers) by heating in 45 cc. of concentrated hydrochloric acid and 45 cc. of water for 5 minutes, concentrating by evaporation at reduced pressure and recrystallizing the residue from isopropanol/ether.

The 7 - methyl - 2 - n - propyl - 1,2,3,4,4a,10a - hexahydro-5H[1]benzothiopyrano[2,3-c]pyridin - 5 - ol, used as starting material, may be produced as follows:

(a) 30 g. of 7-methyl-1,2,3,4,4a,10a-hexahydro-5H-[1]benzothiopyrano[2,3-c]pyridin - 5 - one [production see Example 31, section (b)], are dissolved in 500 cc. of absolute benzene, 14.5 g. of triethylamine and then 13 g. of propionyl chloride in 70 cc. of absolute benzene are added, in accordance with the process described in Example 24, section (a). After working up in analogous manner the resulting 7-methyl-2-propionyl-1,2,3,4,4a,10a-hexahydro - 5H - [1]benzothiopyrano[2,3-c]pyridin - 5-one is recrystallized from ethanol/ether; M.P. 120–121°.

(b) 29.6 g. of 7-methyl-2-propionyl-1,2,3,4,4a,10a-hexahydro-5H-[1]benzothiopyrano[2,3-c]pyridin - 5 - one in 180 cc. of absolute tetrahydrofuran are reduced with 17 g. of lithium aluminium hydride in 600 cc. of absolute tetrahydrofuran in accordance with the process described in Example 24, section (b). The resulting 7-methyl-2-n-propyl - 1,2,3,4,4a,10a - hexahydro - 5H - [1]benzothiopyrano[2,3-c]pyridin-5-ol is crystallized from isopropanol. M.P. 132–147° (mixture of isomers).

EXAMPLE 33

(−)-7-chloro-2-methyl-1,3,4,10a-tetrahydro-2H-[1]benzothiopyrano[2,3-c]pyridine 36 g. of 7-chloro-2-methyl-1,3,4,10a-tetrahydro-2H-[1]benzothiopyrano[2,3-c]pyridine base (production see Example 4) are dissolved in 300 cc. of ethanol at 50° and a solution of 26.6 g. of (+)-dibenzoyl-L-tartaric acid in 400 cc. of ethanol is added. The mixture is allowed to stand at room temperature for 12 hours and the product which crystallizes is then filtered off and crystallized thrice from 1.5 liter amounts of 95% ethanol. The resulting (+)-dibenzoyl tartrate is suspended in 200 cc. of water, 200 cc. of methylene chloride are added to the suspension and the mixture is made alkaline with a concentrated solution of caustic soda. After separating the organic solution the aqueous portion is again extracted twice with methylene chloride, the combined extracts are washed with water, dried over potassium carbonate and the solvent is evaporated at reduced pressure. The base of the title compound obtained as residue is crystallized from ethanol. M.P. 95–97°. $[\alpha]_D^{22} = -43.6°$ (c.=1 in benzene).

EXAMPLE 34

(+)-7-chloro-2-methyl-1,3,4,10a-tetrahydro-2H-[1]benzothiopyrano[2,3-c]pyridine

The first ethanolic mother liquor of the crystallization of (+)-dibenzoyl tartrate (see Example 33) is concentrated by evaporation at reduced pressure. The residue is taken up in 200 cc. of water and 200 cc. of methylene chloride, the mixture is made alkaline with a caustic soda solution, the organic phase is separated and the aqueous portion is again extracted with methylene chloride. After washing the extracts with water, drying over sodium sulphate and evaporating the solvent, the residue (15 g.) is dissolved in 250 cc. of ethanol at 50°, a solution of 22 g. of (−)-dibenzoyl-D-tartaric acid in 100 cc. of ethanol is added to the solution and the solution is allowed to stand at room temperature for 2 days. The (−)-dibenzoyl tartrate which crystallizes is filtered off, recrystallized twice from 1.5 liter amounts of 95% ethanol and converted into the base in a manner analogous to that described in Example 33. The base of the title compound is recrystallized from ethanol. M.P. 96–97°. $[\alpha]_D^{22} = +43.6°$ (c.=1 in benzene).

EXAMPLE 35

2-(2-butynyl)-1,3,4,10a-tetrahydro-2H-[1]benzothiopyrano[2,3-c]pyridine 7 g. of 2-(2-butynyl)-1,2,3,4,4a,10a-hexahydro-5H-[1] benzothiopyrano[2,3-c]pyridin-5-ol (mixture of isomers) are heated to the boil for 30 minutes in 100 cc. of 4 N hydrochloric acid, the solution is cooled to 0°, and the hydrochloride of the title compound, which crystallizes, is recrystallized from ethanol. M. P. 178–179° (decomp.).

The 2 - (2 - butynyl) - 1,2,3,4,4a,10a-hexahydro-5H-[1]benzothiopyrano[2,3-c]pyridin-5-ol, used as starting material, may be produced as follows:

(a) A solution of 17.2 g. of 1,3-dichloro-2-butene in 100 cc. of anhydrous chloroform is added dropwise at room temperature during the course of 1 hour to a mixture of 25 g. of 1,2,3,4,4a,10a-hexahydro-5H-[1]benzothiopyrano[2,3-c]pyridin-5-ol [production see Example 2, section (c)] and 27 g. of anhydrous sodium carbonate in 500 cc. of anhydrous chloroform. The suspension is then heated to the boil for 18 hours, is filtered whilst hot and the precipitate is washed with chloroform. The combined extracts are washed with water, dried over magnesium sulphate and concentrated by evaporation at reduced pressure. The 2-(2-chloro-2-butenyl)-1,2,3,4,4a,10a-hexahydro - 5H - [1]benzothiopyrano[2,3-c]pyridin-5-ol, obtained as residue, is recrystallized from isopropanol. M.P. 128–129°.

(b) A solution of 9.0 g. of 2-(2-chloro-2-butenyl)-1,2,3,4,4a,10a - hexahydro - 5H - [1]benzothiopyrano-[2,3-c]pyridin-5-ol in 10 cc. of n-butanol is added in an atmosphere of nitrogen to a solution of 6 g. of potassium hydroxide in 55 cc. of n-butanol, and the mixture is stirred at 115° for 24 hours. After cooling, 200 cc. of benzene are added to the reaction mixture, the mixture is washed until neutral with a common salt solution, is dried over magnesium sulphate and concentrated by evaporation at reduced pressure. The residue is recrystallized from ethanol. 2-(2-butynyl)-1,2,3,4,4a,10a-hexahydro-5H-[1]benzothiopyrano[2,3-c]pyridin-5-ol (mixture of isomers) has a M.P. of 153–155°. Isomer A has a M.P. of 155–156° (from ethanol).

What is claimed is:

1. A compound of the formula:

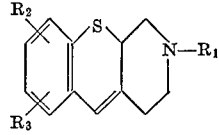

in which $R_1$ is hydrogen, alkyl having 1 to 6 carbon atoms, alkenyl having 2 to 6 carbon atoms, alkinyl having 2 to 6 carbon atoms, cycloalkyl having 3 to 6 ring carbon atoms, cycloalkenyl having 4 to 6 ring carbon atoms, cycloalkyl alkyl or cycloalkenyl alkyl, in which the cyclic moieties have 3 to 6 ring carbon atoms and 4 to 6 ring carbon atoms, respectively, and the alkyl moieties thereof have 1 to 4 carbon atoms, and $R_2$ and $R_3$ are hydrogen, halogen, hydroxy, alkyl having 1 to 6 carbon atoms or alkoxy having 1 to 6 carbon atoms, or a physiologically acceptable acid addition salt thereof.

2. 2 - methyl - 1,3,4,10a - tetrahydro - 2H - [1]benzothiopyrano[2,3-c]pyridine.

3. A physiologically acceptable acid addition salt of the compound of claim 2.

4. A compound according to claim 1, selected from the group consisting of 1,3,4,10a-tetrahydro-2H-[1]benzothiopyrano[2,3-c]pyridine and physiologically acceptable acid addition salts thereof.

5. A compound according to claim 1, selected from the group consisting of 2,7-dimethyl-1,3,4,10a-tetrahydro-2H-[1]benzothiopyrano[2,3-c]pyridine and physiologically acceptable acid addition salts thereof.

6. A compound according to claim 1, selected from the group consisting of 7-chloro-2-methyl-1,3,4,10a-tetrahydro-2H-[1]benzothiopyrano[2,3-c]pyridine and physiologically acceptable acid addition salts thereof.

7. A compound according to claim 1, selected from the group consisting of 8-chloro-2-methyl-1,3,4,10a-tetrahydro-2H-[1]benzothiopyrano[2,3-c]pyridine and physiologically acceptable acid addition salts thereof.

8. A compound according to claim 1, selected from the group consisting of 7-bromo-2-methyl-1,3,4,10a-tetrahydro-2H - [1]benzothiopyrano[2,3-c]pyridine and physiologically acceptable acid addition salts thereof.

9. A compound according to claim 1, selected from the group consisting of 7-methoxy-2-methyl-1,3,4,10a-tetrahydro-2H-[1]benzothiopyrano[2,3-c]pyridine and physiologically acceptable acid addition salts thereof.

10. A compound according to claim 1, selected from the group consisting of 2-n-butyl-1,3,4,10a-tetrahydro-2H-[1]benzothiopyrano[2,3-c]pyridine and physiologically acceptable acid addition salts thereof.

11. A compound according to claim 1, selected from the group consisting of 2-n-propyl-1,3,4,10a-tetrahydro-2H-[1]benzothiopyrano[2,3-c]pyridine and physiologically acceptable acid addition salts thereof.

12. A compound according to claim 1, selected from the group consisting of 7,8-dimethoxy-2-methyl-1,3,4,10a-tetrahydro - 2H - [1]benzothiopyrano[2,3-c]pyridine and physiologically acceptable acid addition salts thereof.

13. A compound according to claim 1, selected from the group consisting of 2-ethyl-1,3,4,10a-tetrahydro-2H-[1]benzothiopyrano[2,3-c]pyridine and physiologically acceptable acid addition salts thereof.

14. A compound according to claim 1, selected from the group consisting of 2-isopropyl-1,3,4,10a-tetrahydro-2H-[1]benzothiopyrano[2,3-c]pyridine and physiologically acceptable acid addition salts thereof.

15. A compound according to claim 1, selected from the group consisting of 2-allyl-1,3,4,10a-tetrahydro-2H-[1]benzothiopyrano[2,3-c]pyridine and physiologically acceptable acid addition salts thereof.

16. A compound according to claim 1, selected from the group consisting of 2-propargyl-1,3,4,10a-tetrahydro-2H-[1]benzothiopyrano[2,3-c]pyridine and physiologically acceptable acid addition salts thereof.

17. A compound according to claim 1, selected from the group consisting of 2-isobutyl-1,3,4,10a-tetrahydro-2H - [1]benzothiopyrano[2,3-c]pyridine and physiologically acceptable acid addition salts thereof.

18. A compound according to claim 1, selected from the group consisting of 7-hydroxy-2-methyl-1,3,4,10a-tetrahydro - 2H - [1]benzothiopyrano[2,3-c]pyridine and physiologically acceptable acid addition salts thereof.

19. A compound according to claim 1, selected from the group consisting of 2-cyclopropylmethyl-1,3,4,10a-tetrahydro-2H- [1]benzothiopyrano[2,3 - c]pyridine and physiologically acceptable acid addition salts thereof.

20. A compound according to claim 1, selected from the group consisting of 2-cyclohexylmethyl-1,3,4,10a-tetrahydro - 2 - [1]benzothiopyrano[2,3 - c]pyridine and physiologically acceptable acid addition salts thereof.

21. A compound according to claim 1, selected from the group consisting of 7-chloro-2-cyclohexylmethyl-1,3,4,10a-tetrahydro-2H-[1]benzothiopyrano[2,3 - c]pyridine and physiologically acceptable acid addition salts thereof.

22. A compound according to claim 1, selected from the group consisting of 9-bromo-2-methyl-1,3,4,10a-tetrahydro-2H-[1]benzothiopyrano[2,3-c]pyridine and physiologically acceptable acid addition salts thereof.

23. A compound according to claim 1, selected from the group consisting of 7-chloro-1,3,4,10a-tetrahydro-2H-[1]benzothiopyrano[2,3-c]pyridine and physiologically acceptable acid addition salts thereof.

24. A compound according to claim 1, selected from the group consisting of 7-chloro-2-n-propy-1,3,4,10a-tetrahydro-2H-[1]benzothiopyrano[2,3-c]pyridine and physiologically acceptable acid addition salts thereof.

25. A compound according to claim 1, selected from the group consisting of 9-chloro-2-methyl-1,3,4,10a-tetrahydro-2H-[1]benzothiopyrano[2,3-c]pyridine and physiologically acceptable acid addition salts thereof.

26. A compound according to claim 1, selected from the group consisting of 9-chloro-1,3,4,10a-tetrahydro-2H-[1]benzothiopyrano[2,3-c]pyridine and physiologically acceptable acid addition salts thereof.

27. A compound according to claim 1, selected from the group consisting of 7-fluoro-2-methyl-1,3,4,10a-tetrahydro - 2H - [1]benzothiopyrano[2,3-c]pyridine and physiologically acceptable acid addition salts thereof.

28. A compound according to claim 1, selected from the group consisting of 7-fluoro-1,3,4,10a-tetrahydro-2H-[1]benzothiopyrano[2,3 - c]pyridine and physiologically acceptable acid addition salts thereof.

29. A compound according to claim 1, selected from the group consisting of 6,9-dichloro-2-methyl-1,3,4,10a-tetrahydro-2H - [1]benzothiopyrano[2,3 - c]pyridine and physiologically acceptable acid addition salts thereof.

30. A compound according to claim 1, selected from the group consisting of 7,9-dichloro-2-methyl-1,3,4,10a-tetrahydro-2H - [1]benzothiopyrano[2,3 - c]pyridine and physiologically acceptable acid addition salts thereof.

31. A compound according to claim 1, selected from the group consisting of 7-methyl-1,3,4,10a-tetrahydro-2H-[1]benzothiopyrano[2,3-c]pyridine and physiologically acceptable acid addition salts thereof.

32. A compound according to claim 1, selected from the group consisting of 7-methyl-2-n-propyl-1,3,4,10a-tetrahydro-2H - [1]benzothiopyrano[2,3 - c]pyridine and physiologically acceptable acid addition salts thereof.

33. A compound according to claim 1, selected from the group consisting of 2-(2-butynyl)-1,3,4,10a-tetrahydro-2H-[1]benzothiopyrano[2,3-c]pyridine and physiologically acceptable acid addition salts thereof.

34. A compound of the formula:

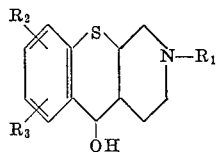

in which $R_1$ is hydrogen, alkyl having 1 to 6 carbon atoms, or alkenyl having 2 to 6 carbon atoms, alkinyl having 2 to 6 carbon atoms, cycloalkyl having 3 to 6 ring carbon atoms, cycloalkenyl having 4 to 6 ring carbon atoms, cycloalkyl alkyl or cycloalkenyl alkyl, in which the cyclic moieties have 3 to 6 ring carbon atoms, and 4 to 6 ring carbon atoms, respectively, and the alkyl moieties thereof have 1 to 4 carbon atoms, and $R_2$ and $R_3$ are hydrogen, halogen, hydroxy, alkyl having 1 to 6 carbon atoms or alkoxy having 1 to 6 carbon atoms, or an acid addition salt thereof.

35. A compound of the formula:

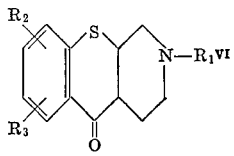

in which $R_2$ and $R_3$ are hydrogen, halogen, hydroxy, alkyl having 1 to 6 carbon atoms or alkoxy having 1 to 6 carbon atoms, and $R_1^{VI}$ is hydrogen, alkyl having 1 to 6 carbon atoms, alkenyl having 2 to 6 carbon atoms, alkinyl having 2 to 6 carbon atoms, cycloalkyl having 3 to 6 ring carbon atoms, cycloalkenyl having 4 to 6 ring carbon atoms, cycloalkyl alkyl or cycloalkenyl alkyl, in which the cyclic moieties have 3 to 6 ring carbon atoms and 4 to 6 ring carbon atoms, respectively, and the alkyl moieties thereof have 1 to 4 carbon atoms, or benzyl, or an acid addition salt thereof.

36. A compound according to claim 35, selected from the group consisting of 2-methyl-1,2,3,4,4a,10a-hexahydro-5H-[1]benzothiopyrano[2,3-c]pyridin-5-one and acid addition salts thereof.

37. A compound according to claim 35, selected from the group consisting of 1,2,3,4,4a,10a-hexahydro-5H-[1]benzothiopyrano[2,3-c]pyridin-5-one and acid addition salts thereof.

38. A compound according to claim 35, selected from the group consisting of 2,7-dimethyl-1,2,3,4,4a,10a-hexahydro-5H-[1]benzothiopyrano[2,3-c]pyridin-5-one and acid addition salts thereof.

39. A compound according to claim 35, selected from the group consisting of 7-chloro-2-methyl-1,2,3,4,4a,10a-hexahydro-5H-[1]benzothiopyrano[2,3-c]pyridin-5-one and acid addition salts thereof.

40. A compound according to claim 35, selected from the group consisting of 8-chloro-2-methyl-1,2,3,4,4a,10a-hexahydro-5H-[1]benzothiopyrano[2,3-c]pyridin-5-one and acid addition salts thereof.

41. A compound according to claim 35, selected from the group consisting of 7-bromo-2-methyl-1,2,3,4,4a,10a-hexahydro-5H-[1]benzothiopyrano[2,3-c]pyridin-5-one and acid addition salts thereof.

42. A compound according to claim 35, selected from the group consisting of 7-methoxy-2-methyl-1,2,3,4,4a,10a-hexahydro-5H-[1]benzothiopyrano[2,3-c]pyridin-5-one and acid addition salts thereof.

43. A compound according to claim 35, selected from the group consisting of 2-butyl-1,2,3,4,4a,10a-hexahydro-5H-[1]benzothiopyrano[2,3,c]pyridin-5-one and acid addition salts thereof.

44. A compound according to claim 35, selected from the group consisting of 7,8-dimethoxy-2-methyl-1,2,3,4,4a,10a - hexahydro - 5H-[1]benzothiopyrano[2,3-c]pyridin-5-one and acid addition salts thereof.

45. A compound according to claim 35, selected from the group consisting of 7-hydroxy-2-methyl-1,2,3,4,4a,10a-hexahydro - 5H-[1]benzothiopyrano[2,3-c]pyridin-5-one and acid addition salts thereof.

46. A compound according to claim 35, selected from the group consisting of 2-cyclopropyl-carbonyl-1,2,3,4,4a,10a - hexahydro - 5H-[1]benzothiopyrano[2,3-c]pyridin-5-one and acid addition salts thereof.

47. A compound according to claim 35, selected from the group consisting of 7-chloro-1,2,3,4,4a,10a-hexahydro-5H-[1]benzothiopyrano-[2,3-c]pyridin-5-one and acid addition salts thereof.

48. A compound according to claim 35, selected from the group consisting of 9-bromo-2-methyl-1,2,3,4,4a,10a-hexahydro - 5H-[1]benzothiopyrano[2,3-c]pyridin-5-one and acid addition salts thereof.

49. A compound according to claim 35, selected from the group consisting of 9-chloro-2-methyl-1,2,3,4,4a,10a-hexahydro - 5H-[1]benzothiopyrano[2,3-c]pyridin-5-one and acid addition salts thereof.

50. A compound according to claim 35, selected from the group consisting of 9-chloro-1,2,3,4,4a,10a-hexahydro-5H-[1]benzothiopyrano[2,3-]pyridin-5-one and acid additions salts thereof.

51. A compound according to claim 35, selected from the group consisting of 7-fluoro-2-methyl-1,2,3,4,4a,10a-hexadydro-5H-[1]benzothiopyrano[2,3-c]pyridin - 5 - one and acid addition salts thereof.

52. A compound according to claim 35, selected from the group consisting of 7-fluoro-1,2,3,4,4a,10a-hexahydro-5H-[1]benzothiopyrano[2,3-c]pyridin-5-one and acid addition salts thereof.

53. A compound according to claim 35, selected from the group consisting of 6,9-dichloro-2-methyl-1,2,3,4,4a, 10a - hexahydro-5H-[1]benzothiopyrano[2,3-c]pyridin-5-one and acid addition salts thereof.

54. A compound according to claim 35, selected from the group consisting of 7,9-dichloro-2-methyl-1,2,3,4,4a, 10a - hexahydro-5H-[1]benzothiopyrano[2,3-c]pyridin-5-one and acid addition salts thereof.

55. A compound according to claim 35, selected from the group consisting of 7-methyl-1,2,3,4,4a,10a-hexahydro-5H-[1]benzothiopyrano[2,3-c]pyridin-5-one and acid addition salts thereof.

References Cited
UNITED STATES PATENTS

| | | | |
|---|---|---|---|
| 2,075,359 | 3/1937 | Salzberg et al. | 424—250 |
| 3,408,353 | 10/1968 | Tucker et al. | 260—293.4 |

HENRY R. JILES, Primary Examiner

S. D. WINTERS, Assistant Examiner

U.S. Cl. X.R.

424—267; 260—295